United States Patent
Chen et al.

(10) Patent No.: US 12,470,832 B2
(45) Date of Patent: Nov. 11, 2025

(54) HIGH DYNAMIC RANGE HDR VIDEO PROCESSING METHOD, ENCODING DEVICE, AND DECODING DEVICE

(71) Applicant: HUAWEI TECHNOLOGIES CO., LTD., Guangdong (CN)

(72) Inventors: Hu Chen, Munich (DE); Elena Alexandrovna Alshina, Munich (DE); Weiwei Xu, Shenzhen (CN); Quanhe Yu, Shenzhen (CN); Yichuan Wang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 364 days.

(21) Appl. No.: 17/971,086

(22) Filed: Oct. 21, 2022

(65) Prior Publication Data

US 2023/0049334 A1  Feb. 16, 2023

Related U.S. Application Data

(63) Continuation of application No. PCT/CN2021/083333, filed on Mar. 26, 2021.

(30) Foreign Application Priority Data

May 8, 2020 (CN) .......................... 202010390234.7

(51) Int. Cl.
*H04N 23/741* (2023.01)
*G06T 5/92* (2024.01)
(Continued)

(52) U.S. Cl.
CPC ............. *H04N 23/741* (2023.01); *G06T 5/92* (2024.01); *G06V 10/60* (2022.01); *H04N 9/64* (2013.01);
(Continued)

(58) Field of Classification Search
CPC .... H04N 23/741; H04N 19/154; G06V 10/60; G06T 5/92; G06T 2207/20208
See application file for complete search history.

(56) References Cited

U.S. PATENT DOCUMENTS

| 10,609,395 B2 | 3/2020 | Kerofsky et al. |
| 2014/0169669 A1 | 6/2014 | Yeh et al. |

(Continued)

FOREIGN PATENT DOCUMENTS

| CN | 103250182 A | 8/2013 |
| CN | 106937121 A | 7/2017 |

(Continued)

OTHER PUBLICATIONS

Eilertsen et al. "Real-time noise-aware tone mapping." ACM Transactions on Graphics (TOG) 34.6 (2015): 1-15. (Year: 2015).*

(Continued)

*Primary Examiner* — Oneal R Mistry
*Assistant Examiner* — Nhut Huy Pham

(57) ABSTRACT

This application provides a high dynamic range HDR video processing method, an encoding device, and a decoding device. The method includes: obtaining dynamic metadata of an $N^{th}$ HDR video frame according to a dynamic metadata generation algorithm; calculating a tone-mapping (tone-mapping) curve parameter of the $N^{th}$ HDR video frame based on the dynamic metadata of the $N^{th}$ HDR video frame; generating a tone-mapping curve based on the curve parameter; determining, according to a quality assessment algorithm, distortion D' caused by the tone-mapping curve; comparing D' and $D_T$, to determine a mode used by the $N^{th}$ HDR video frame, where the mode is an automatic mode or a director mode, and $D_T$ is a threshold value; and determining metadata of the $N^{th}$ HDR video frame based on the determined mode used by the $N^{th}$ HDR video frame.

16 Claims, 16 Drawing Sheets

(51) Int. Cl.
*G06V 10/40* (2022.01)
*G06V 10/60* (2022.01)
*H04N 9/64* (2023.01)
*H04N 19/154* (2014.01)

(52) U.S. Cl.
CPC .. *H04N 19/154* (2014.11); *G06T 2207/20208* (2013.01)

(56) References Cited

U.S. PATENT DOCUMENTS

| | | | |
|---|---|---|---|
| 2017/0256039 A1 | 9/2017 | Hsu et al. | |
| 2017/0353704 A1 | 12/2017 | Su et al. | |
| 2018/0007356 A1 | 1/2018 | Kadu et al. | |
| 2018/0152686 A1 | 5/2018 | Wozniak et al. | |
| 2018/0261184 A1* | 9/2018 | Ninan | G06T 5/92 |
| 2019/0043233 A1* | 2/2019 | Kim | G06T 5/92 |
| 2019/0172187 A1 | 6/2019 | Knibbeler et al. | |
| 2020/0014897 A1* | 1/2020 | Kim | H04N 9/77 |
| 2020/0134792 A1* | 4/2020 | Mandal | G06T 5/92 |
| 2020/0286213 A1* | 9/2020 | Unger | H04N 1/6027 |

FOREIGN PATENT DOCUMENTS

| | | |
|---|---|---|
| CN | 109891901 A | 6/2019 |
| CN | 110050464 A | 7/2019 |
| CN | 110545413 A | 12/2019 |
| CN | 110708545 A | 1/2020 |
| CN | 110910347 A | 3/2020 |
| CN | 111033557 A | 4/2020 |
| WO | 2008004439 A1 | 1/2008 |
| WO | 2017035661 A1 | 3/2017 |
| WO | WO-2018035879 A1 * | 3/2018 ............ G06T 5/009 |
| WO | 2020061172 A1 | 3/2020 |

OTHER PUBLICATIONS

ETSI TS 103 433-2 V1.2.1 (Mar. 2020), High-Performance Single Layer High Dynamic Range (HDR) System for use in Consumer Electronics devices; Part 2: Enhancements for Perceptual Quantization (PQ) transfer function based High Dynamic Range (HDR) Systems (SL-HDR2), 80 pages, XP014366990.

Tunc Ozan Aydn et al, Dynamic Range Independent Image Quality Assessment, ACM Transactions on Graphics, vol. 27, No. 3, Article 69, Publication date: Aug. 2008, 10 pages.

Rafal Mantiuk et al, Display Adaptive Tone Mapping, ACM Transactions on Graphics, vol. 27, No. 3, Article 68, Publication date: Aug. 2008, 10 pages, XP055365416.

Manish Narwaria et al, HDR-VDP-2.2: A calibrated method for objective quality predictionof high dynamic range and standard images, Jan. 2015, Journal of Electronic Imaging 24(1):010501, 10 pages.

SMPTE ST 2094-10:2016, SMPTE Standard, Dynamic Metadata for Color Volume Transform-Application #1, May 18, 2016, 15 pages.

SMPTE ST 2094-20:2016, SMPTE Standard, Dynamic Metadata for Color Volume Transform Application #2, Jul. 6, 2016, 23 pages.

SMPTE ST 2094-30:2016, SMPTE Standard, Dynamic Metadata for Color Volume Transform Application #3, Jul. 6, 2016, 15 pages.

SMPTE ST 2094-40:2016, SMPTE Standard, Dynamic Metadata for Color Volume Transform Application #4, Aug. 24, 2016, 26 pages.

* cited by examiner

200

S210: An encoding device obtains dynamic metadata of an Nth HDR video frame according to a dynamic metadata generation algorithm S220: The encoding device calculates a tone-mapping tone-mapping curve parameter of the $N^{th}$ HDR video frame according to the dynamic metadata of the $N^{th}$ HDR video frame S230: The encoding device generates a tone-mapping curve based on the curve parameter S240: The encoding device determines, according to a quality assessment algorithm, distortion caused by the tone-mapping curve S250: The encoding device determines a mode used by the $N^{th}$ HDR video frame S260: The encoding device determines metadata of the $N^{th}$ HDR video frame based on the determined mode used by the $N^{th}$ HDR video

S610: A decoding device obtains an $N^{th}$ HDR video frame and metadata of the $N^{th}$ HDR video frame S620: The decoding device determines, according to a flag bit in the metadata, a mode used by the $N^{th}$ HDR video frame

S1001: Extract basic dynamic metadata of an $N^{th}$ HDR video frame according to a dynamic metadata extraction algorithm S1002: Calculate a tone-mapping tone-mapping curve parameter of the $N^{th}$ HDR video frame in an automatic mode according to the basic dynamic metadata S1003: Generate a tone-mapping curve in the automatic mode based on the curve parameter in the automatic mode S1004: Determine, according to a quality assessment algorithm, distortion caused by the tone-mapping curve in the automatic mode S1005: Compare for whether the distortion caused by the curve in the automatic mode is greater than a preset value S1006: Determine that the Nth HDR video frame uses the automatic mode S1007: A decoding device predicts an offset delta of an optimal curve parameter relative to the parameter p in the automatic mode by using a time-domain filtering method

HIGH DYNAMIC RANGE HDR VIDEO PROCESSING METHOD, ENCODING DEVICE, AND DECODING DEVICE

CROSS-REFERENCE TO RELATED APPLICATIONS

This application is a continuation of International Application No. PCT/CN2021/083333, filed on Mar. 26, 2021, which claims priority to Chinese Patent Application No. 202010390234.7, filed on May 8, 2020. The disclosures of the aforementioned applications are hereby incorporated by reference in their entireties.

TECHNICAL FIELD

This application relates to the field of image processing technologies, and more specifically, to a high dynamic range HDR video processing method, an encoding device, and a decoding device.

BACKGROUND

A dynamic range mapping method is mainly applied to adaptation between a front-end high dynamic range (HDR) signal and a back-end HDR terminal display device, and generally includes a tone-mapping process from high luminance to low luminance and a tone-mapping process from low luminance to high luminance. Before an HDR video is encoded on an encoder side, preprocessing needs to be performed first. A mode used by the HDR video is used in a preprocessing process, and the mode generally includes an automatic mode or a director mode. An algorithm for the automatic mode is an empirical formula obtained based on massive test data, and can cover most scenes in practice. However, in some scenes, a curve calculated in the automatic mode cannot achieve good effect. The director mode means that a director colorist manually adjusts and determines a parameter, or predicts and corrects a parameter of the automatic mode to further optimize a curve parameter to obtain the director mode. Usually, the director mode after correction can achieve good effect. Therefore, how to select a mode used by an HDR video is an urgent problem to be resolved.

SUMMARY

This application provides a high dynamic range HDR video processing method, an encoding device, and a decoding device. In the method, a mode used by an HDR video may be determined on an encoder side according to a quality assessment algorithm.

According to a first aspect, a high dynamic range HDR video processing method is provided. The method is applied to an encoding device and includes: obtaining dynamic metadata of an $N^{th}$ HDR video frame according to a dynamic metadata generation algorithm, where N is greater than 0; calculating a tone-mapping curve parameter of the $N^{th}$ HDR video frame based on the dynamic metadata of the $N^{th}$ HDR video frame; generating a tone-mapping curve based on the curve parameter; determining, according to a quality assessment algorithm, distortion D' caused by the tone-mapping curve; comparing D' and $D_T$, to determine a mode used by the $N^{th}$ HDR video frame, where the mode is an automatic mode or a director mode, and $D_T$ is a threshold value; and determining metadata of the $N^{th}$ HDR video frame based on the determined mode used by the $N^{th}$ HDR video frame.

Whether the mode used by the $N^{th}$ HDR video frame is the automatic mode or the director mode is determined by comparing $D_T$ and the distortion D' that is caused by the tone-mapping curve and that is determined according to the quality assessment algorithm, so that the mode used by an HDR video can be determined based on the distortion caused by the tone-mapping curve. This achieves better tone-mapping effect.

With reference to the first aspect, in some implementations of the first aspect, the comparing D' and $D_T$, to determine a mode used by the $N^{th}$ HDR video frame includes: determining that the $N^{th}$ HDR video frame uses the director mode when D' is greater than $D_T$, where $D_T$ is distortion of the $N^{th}$ HDR video frame in the director mode; or determining that the $N^{th}$ HDR video frame uses the automatic mode when D' is less than or equal to $D_T$.

With reference to the first aspect, in some implementations of the first aspect, the method further includes: obtaining an offset deltaC[N] of the tone-mapping curve parameter of the $N^{th}$ HDR video frame based on metadata of (N−M, N) frames in an M-frame window, the tone-mapping curve parameter, and D', where M is greater than 0.

With reference to the first aspect, in some implementations of the first aspect, an adjusted tone-mapping curve is generated based on the deltaC[N]; and distortion $D_T$ caused by the adjusted tone-mapping curve is determined according to the quality assessment algorithm.

With reference to the first aspect, in some implementations of the first aspect, the determining metadata of the $N^{th}$ HDR video frame includes: generating the metadata of the $N^{th}$ HDR video frame based on the mode used by the $N^{th}$ HDR video frame, the dynamic metadata generation algorithm, and the offset deltaC[N] of the tone-mapping curve parameter.

With reference to the first aspect, in some implementations of the first aspect, the method is applied to any one or more of the following preset configuration parameters: 1000-nit, 500-nit, and a standard dynamic range SDR.

With reference to the first aspect, in some implementations of the first aspect, the tone-mapping (tone-mapping) curve is shown by the formula (1):

$$L' = F(L) = a \times \left(\frac{p \times L^n}{(p-1) \times L^n + 1}\right)^m + b \quad (1)$$

Curve parameters a and p are determined based on the dynamic metadata of the $N^{th}$ HDR video frame, curve parameters b, n, and m are preset values, L is input luminance, and L' is output luminance.

With reference to the first aspect, in some implementations of the first aspect, the method further includes: determining a plurality of offsets of the adjusted curve parameter p based on a predicted offset of the curve parameter p and K×basic step size, where K is a positive integer greater than or equal to 0; determining, based on the plurality of offsets of the curve parameter p, curve parameters p" and a" corresponding to each of the plurality of offsets of the curve parameter p; generating a plurality of adjusted tone-mapping curves based on the parameters p" and a" corresponding to each of the plurality of offsets; determining, according to the quality assessment algorithm, distortion D" caused by each of the plurality of adjusted tone-mapping curves; and selecting any D" meeting a first condition from the plurality of D", where tone-mapping curve parameters p" and a" corresponding to the any D" are selected as adjustment targets of curve parameters p' and a', and $D_T$ is the any D" that is selected.

With reference to the first aspect, in some implementations of the first aspect, the determining a plurality of offsets of the adjusted curve parameter p based on a predicted offset of the curve parameter p and K×basic step size includes: When K is 1, the determined offset is the predicted offset of the curve parameter p plus the basic step size, and the predicted offset of the curve parameter p minus the basic step size.

With reference to the first aspect, in some implementations of the first aspect, the first condition is selecting a tone-mapping curve parameter corresponding to smaller distortion D" between two distortion D" values.

With reference to the first aspect, in some implementations of the first aspect, the determining a plurality of offsets of the adjusted curve parameter p based on a predicted offset of the curve parameter p and K×basic step size includes:
determine the plurality of offsets based on the basic delta±M×basic step size (stepsize), where M is each positive integer less than or equal to K.

With reference to the first aspect, in some implementations of the first aspect, the first condition is selecting a smallest D" from the plurality of D", or selecting a D" less than a first threshold from the plurality of D".

With reference to the first aspect, in some implementations of the first aspect, the method further includes:
determining the predicted offset of the curve parameter p according to the formula (2):

$$\text{delta} = \frac{\Sigma_{k=1}^{M} \text{deltaC}[N-k]/D[N-k]}{\Sigma_{k=1}^{M} 1/D[N-k]} \quad (2)$$

deltaC[N−k] represents an offset used by an $(N-k)^{th}$ frame, D[N−k] represents distortion of the $(N-k)^{th}$ frame calculated according to the quality assessment algorithm, and M is a window length.

With reference to the first aspect, in some implementations of the first aspect, the determining metadata of the $N^{th}$ HDR video frame based on the determined mode used by the $N^{th}$ HDR video frame includes: When the mode used by the $N^{th}$ HDR video frame is the automatic mode, the metadata of the $N^{th}$ HDR video frame includes the dynamic metadata of the $N^{th}$ HDR video frame; or when the mode used by the $N^{th}$ HDR video frame is the director mode, the metadata of the $N^{th}$ HDR video frame includes the dynamic metadata of the $N^{th}$ HDR video frame and P[N], where P[N] is a curve parameter P used when the mode used by the $N^{th}$ HDR video frame is the director mode.

With reference to the first aspect, in some implementations of the first aspect, the metadata of the $N^{th}$ HDR video frame includes a flag bit, and the flag bit indicates that the mode used by the $N^{th}$ HDR video frame is the director mode, or the flag bit indicates that the mode used by the $N^{th}$ HDR video frame is the automatic mode.

According to a second aspect, a high dynamic range HDR video processing method is provided. The method is applied to a decoding device and includes: obtaining an $N^{th}$ HDR video frame and metadata of the $N^{th}$ HDR video frame through decoding; and determining, according to a flag bit in the metadata, a mode used by the $N^{th}$ HDR video frame.

With reference to the second aspect, in some implementations of the second aspect, when the flag bit indicates that the mode used by the $N^{th}$ HDR video frame is an automatic mode, the method further includes: calculating a tone-mapping curve parameter in the automatic mode based on the metadata of the $N^{th}$ HDR video frame; generating a tone-mapping curve in the automatic mode based on the tone-mapping curve parameter; and displaying the $N^{th}$ HDR video frame based on the tone-mapping curve in the automatic mode and the $N^{th}$ HDR video frame.

With reference to the second aspect, in some implementations of the second aspect, when the flag bit indicates that the mode used by the $N^{th}$ HDR video frame is a director mode, the method further includes: extracting a tone-mapping curve parameter in the director mode from the dynamic metadata; generating a tone-mapping curve in the director mode based on the curve parameter; and displaying the $N^{th}$ HDR video frame based on the tone-mapping curve in the director mode and the $N^{th}$ HDR video frame.

According to a third aspect, a high dynamic range HDR video processing method is provided. The method is applied to an encoding device and includes: obtaining dynamic metadata of an $N^{th}$ HDR video frame according to a dynamic metadata generation algorithm; calculating a tone-mapping curve parameter of the $N^{th}$ HDR video frame; generating a tone-mapping curve based on the curve parameter; determining, according to a quality assessment algorithm, distortion D' caused by the tone-mapping curve; obtaining an offset deltaC[N] of the curve parameter of the $N^{th}$ HDR video frame based on metadata of (N−M, N) frames in an M-frame window, the tone-mapping curve parameter, and D', where N is greater than 0 and M is greater than 0; generating an adjusted tone-mapping curve according to the offset deltaC[N] of the curve parameter of the $N^{th}$ HDR video frame; and generating metadata of the $N^{th}$ HDR video frame in a director mode according to the dynamic metadata generation algorithm and the offset deltaC[N] of the curve parameter of the $N^{th}$ HDR video frame.

With reference to the third aspect, in some implementations of the third aspect, the method further includes: generating an adjusted tone-mapping curve according to the offset deltaC[N] of the curve parameter of the $N^{th}$ HDR video frame; and determining distortion $D_T$ caused by the adjusted tone-mapping curve according to a quality assessment algorithm, where $D_T$ is used to predict an offset deltaC[N+j] of the $(N+j)^{th}$ frame in the director mode, and j is greater than or equal to 1 and less than or equal to M.

With reference to the third aspect, in some implementations of the third aspect, the method is applied to any one or more of the following preset configuration parameters: 1000-nit, 500-nit, and a standard dynamic range SDR.

With reference to the third aspect, in some implementations of the third aspect, the tone-mapping (tone-mapping) curve is shown by the formula (3):

$$L' = F(L) = a \times \left(\frac{p \times L^n}{(p-1) \times L^n + 1}\right)^m + b \quad (3)$$

Parameters a and p are determined based on the dynamic metadata of the $N^{th}$ HDR video frame, parameters b, n, and m are preset values, L is input luminance, and L' is output luminance.

With reference to the third aspect, in some implementations of the third aspect, deltaC[N] is deltap[N], and the method further includes: determining a plurality of offsets of the adjusted curve parameter p based on a predicted offset of the curve parameter p and K×basic step size, where K is a positive integer greater than or equal to 0; determining, based on the plurality of offsets of the curve parameter p, curve parameters p" and a" corresponding to each of the plurality of offsets of the curve parameter p; generating a plurality of adjusted tone-mapping curves based on the parameters p" and a" corresponding to each of the plurality of offsets; determining, according to the quality assessment algorithm, distortion D" caused by each of the plurality of adjusted tone-mapping curves; and selecting any D" meeting a first condition from the plurality of D", where tone-mapping curve parameters p" and a" corresponding to the any D" are selected as adjustment targets of curve parameters p' and a', and $D_T$ is the any D" that is selected.

With reference to the third aspect, in some implementations of the third aspect, the determining a plurality of offsets of the adjusted curve parameter p based on a predicted offset of the curve parameter p and K×basic step size includes: When K is 1, the determined offset is the predicted offset of the curve parameter p plus the basic step size, and the predicted offset of the curve parameter p minus the basic step size.

With reference to the third aspect, in some implementations of the third aspect, the first condition is selecting a tone-mapping curve parameter corresponding to smaller distortion D" between two distortion D" values.

With reference to the third aspect, in some implementations of the third aspect, the determining a plurality of offsets of the adjusted curve parameter p based on a predicted offset of the curve parameter p and K×basic step size includes: determining the plurality of offsets based on the basic delta±M×basic step size, where M is each positive integer less than or equal to K.

With reference to the third aspect, in some implementations of the third aspect, the first condition is selecting a smallest D" from the plurality of D", or selecting a D" less than a first threshold from the plurality of D".

With reference to the third aspect, in some implementations of the third aspect, the method further includes:
determining the predicted offset of the curve parameter p according to the formula (4):

$$\text{delta} = \frac{\sum_{k=1}^{M} \text{delta}C[N-k]/D[N-k]}{\sum_{k=1}^{M} 1/D[N-k]} \quad (4)$$

deltaC[N−k] represents an offset used by an $(N-k)^{th}$ frame, D[N−k] represents distortion of the $(N-k)^{th}$ frame calculated according to the quality assessment algorithm, and M is a window length.

With reference to the third aspect, in some implementations of the third aspect, that the metadata of the $N^{th}$ HDR video frame is determined based on the director mode used by the $N^{th}$ HDR video frame includes: When the mode used by the $N^{th}$ HDR video frame is the director mode, the metadata of the $N^{th}$ HDR video frame includes the dynamic metadata of the $N^{th}$ HDR video frame and P[N], where P[N] is a curve parameter P used when the mode used by the $N^{th}$ HDR video frame is the director mode.

With reference to the third aspect, in some implementations of the third aspect, the dynamic metadata includes a flag bit, and the flag bit indicates that the mode used by the $N^{th}$ HDR video frame is the director mode.

According to a fourth aspect, a high dynamic range HDR video processing method is provided. The method is applied to a decoding device and includes: obtaining an $N^{th}$ HDR video frame and dynamic metadata of the $N^{th}$ HDR video frame; calculating a tone-mapping (tone-mapping) curve parameter of the $N^{th}$ HDR video frame based on the dynamic metadata of the $N^{th}$ HDR video frame; generating a tone-mapping curve based on the curve parameter; determining, according to a quality assessment algorithm, distortion D' caused by the tone-mapping curve; comparing D' and $D_T$, to determine whether to use an automatic mode, where $D_T$ is a threshold value.

With reference to the fourth aspect, in some implementations of the fourth aspect, an offset deltaC[N] of the tone-mapping curve parameter of the $N^{th}$ HDR video frame is obtained based on metadata of (N−M, N) frames in an M-frame window, the tone-mapping curve parameter, and D' when D' is greater than $D_T$, where N is greater than 0.

With reference to the fourth aspect, in some implementations of the fourth aspect, the method further includes: generating an adjusted tone-mapping curve according to the deltaC[N]; and determining, according to the quality assessment algorithm, distortion $D_T$ caused by the adjusted tone-mapping curve.

With reference to the fourth aspect, in some implementations of the fourth aspect, the dynamic metadata generation algorithm and the offset deltaC[N] of the curve parameter of the $N^{th}$ HDR video frame are used to generate metadata of the $N^{th}$ HDR video frame.

With reference to the fourth aspect, in some implementations of the fourth aspect, the method is applied to any one or more of the following preset configuration parameters: 1000-nit, 500-nit, and a standard dynamic range SDR.

With reference to the fourth aspect, in some implementations of the fourth aspect, the tone-mapping (tone-mapping) curve is shown by the formula (5):

$$L' = F(L) = a \times \left( \frac{p \times L^n}{(p-1) \times L^n + 1} \right)^m + b \quad (5)$$

Parameters a and p are determined based on the dynamic metadata of the $N^{th}$ HDR video frame, parameters b, n, and m are preset values, L is input luminance, and L' is output luminance.

With reference to the fourth aspect, in some implementations of the fourth aspect, deltaC[N] is deltap[N], and the method further includes: determining a plurality of offsets of the adjusted curve parameter p based on a predicted offset of the curve parameter p and K×basic step size, where K is a positive integer greater than or equal to 0; determining, based on the plurality of offsets of the curve parameter p, curve parameters p" and a" corresponding to each of the plurality of offsets of the curve parameter p; generating a plurality of adjusted tone-mapping curves based on the parameters p" and a" corresponding to each of the plurality of offsets; determining, according to the quality assessment algorithm, distortion D" caused by each of the plurality of adjusted tone-mapping curves; and selecting any D" meeting a first condition from the plurality of D", where tone-mapping curve parameters p" and a" corresponding to the any D" are selected as adjustment targets of curve parameters p' and a', and $D_T$ is the selected D".

With reference to the fourth aspect, in some implementations of the fourth aspect, the determining a plurality of offsets of the adjusted curve parameter p based on a predicted offset of the curve parameter p and K×basic step size includes: When K is 1, the determined offset is the predicted offset of the curve parameter p plus the basic step size, and the predicted offset of the curve parameter p minus the basic step size.

With reference to the fourth aspect, in some implementations of the fourth aspect, the first condition is selecting a tone-mapping curve parameter corresponding to smaller distortion D" between two distortion D" values.

With reference to the fourth aspect, in some implementations of the fourth aspect, the determining a plurality of offsets of the adjusted curve parameter p based on a predicted offset of the curve parameter p and K×basic step size includes: determining the plurality of offsets based on the basic delta±M×basic step size, where M is each positive integer less than or equal to K.

With reference to the fourth aspect, in some implementations of the fourth aspect, the first condition is selecting a smallest D" from the plurality of D", or selecting a D" less than a first threshold from the plurality of D".

With reference to the fourth aspect, in some implementations of the fourth aspect, the method further includes:
determining the predicted offset of the curve parameter p according to the formula (6):

$$\text{delta} = \frac{\sum_{k=1}^{M} \text{deltaC}[N-k]/D[N-k]}{\sum_{k=1}^{M} 1/D[N-k]} \quad (6)$$

deltaC[N−k] represents an offset used by an $(N-k)^{th}$ frame, D[N−k] represents distortion of the $(N-k)^{th}$ frame calculated according to the quality assessment algorithm, and M is a window length.

According to a fifth aspect, an encoding device is provided, including: an obtaining unit, where the obtaining unit is configured to obtain dynamic metadata of an $N^{th}$ HDR video frame according to a dynamic metadata generation algorithm; and a processing unit, where the processing unit is configured to calculate a tone-mapping curve parameter of the $N^{th}$ HDR video frame based on the dynamic metadata of the $N^{th}$ HDR video frame; the processing unit is further configured to generate a tone-mapping curve based on the curve parameter; the processing unit is further configured to determine, according to a quality assessment algorithm, distortion D' caused by the tone-mapping curve; the processing unit is further configured to compare D' and $D_T$ to determine a mode used by the $N^{th}$ HDR video frame, where the mode is an automatic mode or a director mode, and $D_T$ is a threshold value; and the processing unit is further configured to determine metadata of the $N^{th}$ HDR video frame based on the determined mode used by the $N^{th}$ HDR video frame.

With reference to the fifth aspect, in some implementations of the fifth aspect, the processing unit is specifically configured to: determine that the $N^{th}$ HDR video frame uses the director mode when D' is greater than $D_T$, where $D_T$ is distortion of the $N^{th}$ HDR video frame in the director mode; or determine that the $N^{th}$ HDR video frame uses the automatic mode when D' is less than or equal to $D_T$.

With reference to the fifth aspect, in some implementations of the fifth aspect, the processing unit is further configured to: obtain an offset deltaC[N] of the curve parameter of the $N^{th}$ HDR video frame based on metadata of (N−M, N) frames in an M-frame window, the tone-mapping curve parameter, and D', where M is greater than 0.

With reference to the fifth aspect, in some implementations of the fifth aspect, the processing unit is further configured to: generate an adjusted tone-mapping curve according to the deltaC[N]; and determine, according to the quality assessment algorithm, distortion $D_T$ caused by the adjusted tone-mapping curve.

With reference to the fifth aspect, in some implementations of the fifth aspect, the processing unit is specifically configured to: generate the metadata of the $N^{th}$ HDR video frame based on the mode used by the $N^{th}$ HDR video frame, the dynamic metadata generation algorithm, and the offset deltaC[N] of the tone-mapping curve parameter.

With reference to the fifth aspect, in some implementations of the fifth aspect, the encoding device is applied to any one or more of the following preset configuration parameters: 1000-nit, 500-nit, and a standard dynamic range SDR.

With reference to the fifth aspect, in some implementations of the fifth aspect, the tone-mapping (tone-mapping) curve is shown by the formula (7):

$$L' = F(L) = a \times \left( \frac{p \times L^n}{(p-1) \times L^n + 1} \right)^m + b \quad (7)$$

Parameters a and p are determined based on the dynamic metadata of the $N^{th}$ HDR video frame, parameters b, n, and m are preset values, L is input luminance, and L' is output luminance.

With reference to the fifth aspect, in some implementations of the fifth aspect, the processing unit is further configured to: determine a plurality of offsets of the adjusted curve parameter p based on a predicted offset of the curve parameter p and K×basic step size, where K is a positive integer greater than or equal to 0; determine, based on the plurality of offsets of the curve parameter p, curve parameters p" and a" corresponding to each of the plurality of offsets of the curve parameter p; generate a plurality of adjusted tone-mapping curves based on the parameters p" and a" corresponding to each of the plurality of offsets; determine, according to the quality assessment algorithm, distortion D" caused by each of the plurality of adjusted tone-mapping curves; and selecting any D" meeting a first condition from the plurality of D", where tone-mapping curve parameters p" and a" corresponding to the any D" are selected as adjustment targets of curve parameters p' and a', and $D_T$ is the selected D".

With reference to the fifth aspect, in some implementations of the fifth aspect, the processing unit is specifically configured to: When K is 1, the determined offset is the predicted offset of the curve parameter p plus the basic step size, and the predicted offset of the curve parameter p minus the basic step size.

With reference to the fifth aspect, in some implementations of the fifth aspect, the first condition is selecting a tone-mapping curve parameter corresponding to smaller distortion D" between two distortion D" values.

With reference to the fifth aspect, in some implementations of the fifth aspect, the processing unit is specifically configured to: determine the plurality of offsets based on the basic delta±M×basic step size, where M is each positive integer less than or equal to K.

With reference to the fifth aspect, in some implementations of the fifth aspect, the first condition is selecting a smallest D" from the plurality of D", or selecting a D" less than a first threshold from the plurality of D".

With reference to the fifth aspect, in some implementations of the fifth aspect, the processing unit is further configured to:
determine the predicted offset of the curve parameter p according to the formula (8):

$$\text{delta} = \frac{\sum_{k=1}^{M} \text{deltaC}[N-k]/D[N-k]}{\sum_{k=1}^{M} 1/D[N-k]} \qquad (8)$$

deltaC[N–k] represents an offset used by an $(N-k)^{th}$ frame, D[N–k] represents distortion of the $(N-k)^{th}$ frame calculated according to the quality assessment algorithm, and M is a window length.

With reference to the fifth aspect, in some implementations of the fifth aspect, the processing unit is specifically configured to: When the mode used by the $N^{th}$ HDR video frame is the automatic mode, the metadata of the $N^{th}$ HDR video frame includes the dynamic metadata of the $N^{th}$ HDR video frame; or when the mode used by the $N^{th}$ HDR video frame is the director mode, the metadata of the $N^{th}$ HDR video frame includes the dynamic metadata of the $N^{th}$ HDR video frame and P[N], where P[N] is a curve parameter P used when the mode used by the $N^{th}$ HDR video frame is the director mode.

With reference to the fifth aspect, in some implementations of the fifth aspect, the metadata includes a flag bit, and the flag bit indicates that the mode used by the $N^{th}$ HDR video frame is the director mode, or the flag bit indicates that the mode used by the $N^{th}$ HDR video frame is the automatic mode.

According to a sixth aspect, a decoding device is provided, including: an obtaining unit, where the obtaining unit is configured to obtain an $N^{th}$ HDR video frame and metadata of the $N^{th}$ HDR video frame through decoding; and a processing unit, where the processing unit is configured to determine, according to a flag bit in the metadata, a mode used by the $N^{th}$ HDR video frame.

With reference to the sixth aspect, in some implementations of the sixth aspect, when the flag bit indicates that the mode used by the $N^{th}$ HDR video frame is an automatic mode, the processing unit is further configured to: calculate a tone-mapping curve parameter in the automatic mode based on the metadata of the $N^{th}$ HDR video frame; generate a tone-mapping curve in the automatic mode based on the tone-mapping curve parameter; and display the $N^{th}$ HDR video frame based on the tone-mapping curve in the automatic mode and the $N^{th}$ HDR video frame.

With reference to the sixth aspect, in some implementations of the sixth aspect, when the flag bit indicates that the mode used by the $N^{th}$ HDR video frame is a director mode, the processing unit is further configured to: extract a tone-mapping curve parameter in the director mode from the dynamic metadata; generate a tone-mapping curve in the director mode based on the curve parameter; and display the $N^{th}$ HDR video frame based on the tone-mapping curve in the director mode and the $N^{th}$ HDR video frame.

According to a seventh aspect, an encoding device is provided, including: an obtaining unit, where the obtaining unit is configured to obtain dynamic metadata of an $N^{th}$ HDR video frame according to a dynamic metadata generation algorithm; and a processing unit, where the processing unit is configured to calculate a tone-mapping curve parameter of the HDR video; the processing unit is further configured to generate a tone-mapping curve based on the curve parameter; the processing unit is further configured to determine, according to a quality assessment algorithm, distortion D' caused by the tone-mapping curve; the processing unit is further configured to obtain an offset deltaC[N] of the curve parameter of the $N^{th}$ HDR video frame based on metadata of (N–M, N) frames in an M-frame window, the tone-mapping curve parameter, and D', where M is greater than 0; and the processing unit is further configured to generate metadata of the $N^{th}$ HDR video frame in a director mode according to the dynamic metadata generation algorithm and the offset deltaC[N] of the curve parameter of the $N^{th}$ HDR video frame.

With reference to the seventh aspect, in some implementations of the seventh aspect, the processing unit is further configured to: generate an adjusted tone-mapping curve according to the offset deltaC[N] of the curve parameter of the $N^{th}$ HDR video frame; and determine distortion $D_T$ caused by the adjusted tone-mapping curve according to a quality assessment algorithm, where $D_T$ is used to predict an offset deltaC[N+j] of the $(N+j)^{th}$ frame in the director mode, and j is greater than or equal to 1 and less than or equal to M.

With reference to the seventh aspect, in some implementations of the seventh aspect, the encoding device is applied to any one or more of the following preset configuration parameters: 1000-nit, 500-nit, and a standard dynamic range SDR.

With reference to the seventh aspect, in some implementations of the seventh aspect, the tone-mapping (tone-mapping) curve is shown by the formula (9):

$$L' = F(L) = a \times \left(\frac{p \times L^n}{(p-1) \times L^n + 1}\right)^m + b \qquad (9)$$

Curve parameters a and p are determined based on the dynamic metadata of the $N^{th}$ HDR video frame, curve parameters b, n, and m are preset values, L is input luminance, and L' is output luminance.

With reference to the seventh aspect, in some implementations of the seventh aspect, the processing unit is further configured to: determine a plurality of offsets of the adjusted curve parameter p based on a predicted offset of the curve parameter p and K×basic step size, where K is a positive integer greater than or equal to 0; determine, based on the plurality of offsets of the curve parameter p, curve parameters p" and a" corresponding to each of the plurality of offsets of the curve parameter p; generate a plurality of adjusted tone-mapping curves based on the parameters p" and a" corresponding to each of the plurality of offsets; determine, according to the quality assessment algorithm, distortion D" caused by each of the plurality of adjusted tone-mapping curves; and selecting any D" meeting a first condition from the plurality of D", where tone-mapping curve parameters p" and a" corresponding to the any D" are selected as adjustment targets of curve parameters p' and a', and $D_T$ is the selected D".

With reference to the seventh aspect, in some implementations of the seventh aspect, the processing unit is specifically configured to: When K is 1, the determined offset is the predicted offset of the curve parameter p plus the basic step size, and the predicted offset of the curve parameter p minus the basic step size.

With reference to the seventh aspect, in some implementations of the seventh aspect, the first condition is selecting a tone-mapping curve parameter corresponding to smaller distortion D" between two distortion D" values.

With reference to the seventh aspect, in some implementations of the seventh aspect, the processing unit is specifically configured to: determine the plurality of offsets based on the basic delta±M×basic step size, where M is each positive integer less than or equal to K.

With reference to the seventh aspect, in some implementations of the seventh aspect, the first condition is selecting a smallest D" from the plurality of D", or selecting a D" less than a first threshold from the plurality of D".

With reference to the seventh aspect, in some implementations of the seventh aspect, the processing unit is further configured to:

determine the predicted offset of the curve parameter p according to the formula (10):

$$\text{delta} = \frac{\sum_{k=1}^{M} \text{delta}C[N-k]/D[N-k]}{\sum_{k=1}^{M} 1/D[N-k]} \quad (10)$$

deltaC[N−k] represents an offset used by an $(N-k)^{th}$ frame, D[N−k] represents distortion of the $(N-k)^{th}$ frame calculated according to the quality assessment algorithm, and M is a window length.

With reference to the seventh aspect, in some implementations of the seventh aspect, the processing unit is specifically configured to: When the mode used by the $N^{th}$ HDR video frame is the director mode, the metadata of the $N^{th}$ HDR video frame includes the dynamic metadata of the $N^{th}$ HDR video frame and P[N], where P[N] is a curve parameter P used when the mode used by the $N^{th}$ HDR video frame is the director mode.

With reference to the seventh aspect, in some implementations of the seventh aspect, the dynamic metadata includes a flag bit, and the flag bit indicates that the mode used by the $N^{th}$ HDR video frame is the director mode.

According to an eighth aspect, a decoding device is provided, including an obtaining unit, where the obtaining unit is configured to obtain an $N^{th}$ HDR video frame and dynamic metadata of the $N^{th}$ HDR video frame; and a processing unit, where the processing unit is configured to calculate a tone-mapping curve parameter of the $N^{th}$ HDR video frame based on the dynamic metadata of the $N^{th}$ HDR video frame; the processing unit is further configured to generate a tone-mapping curve based on the curve parameter; the processing unit is further configured to determine, according to a quality assessment algorithm, distortion D' caused by the tone-mapping curve; and the processing unit is further configured to compare D' and $D_T$, to determine whether to use an automatic mode, where $D_T$ is a threshold value.

With reference to the eighth aspect, in some implementations of the eighth aspect, the processing unit is specifically configured to: obtain an offset deltaC[N] of the curve parameter of the $N^{th}$ HDR video frame based on metadata of (N−M, N) frames in an M-frame window, the tone-mapping curve parameter, and D' when D' is greater than $D_T$, where M is greater than 0.

With reference to the eighth aspect, in some implementations of the eighth aspect, the processing unit is further configured to: generate an adjusted tone-mapping curve according to the deltaC[N]; and determine, according to the quality assessment algorithm, distortion $D_T$ caused by the adjusted tone-mapping curve.

With reference to the eighth aspect, in some implementations of the eighth aspect, the decoding device is applied to any one or more of the following preset configuration parameters: 1000-nit, 500-nit, and a standard dynamic range SDR.

With reference to the eighth aspect, in some implementations of the eighth aspect, the tone-mapping (tone-mapping) curve is shown by the formula (11):

$$L' = F(L) = a \times \left( \frac{p \times L^n}{(p-1) \times L^n + 1} \right)^m + b \quad (11)$$

Parameters a and p are determined based on the dynamic metadata of the $N^{th}$ HDR video frame, parameters b, n, and m are preset values, L is input luminance, and L' is output luminance.

With reference to the eighth aspect, in some implementations of the eighth aspect, the processing unit is further configured to: determine a plurality of offsets of the adjusted curve parameter p based on a predicted offset of the curve parameter p and K×basic step size, where K is a positive integer greater than or equal to 0; determine, based on the plurality of offsets of the curve parameter p, curve parameters p" and a" corresponding to each of the plurality of offsets of the curve parameter p; generate a plurality of adjusted tone-mapping curves based on the parameters p" and a" corresponding to each of the plurality of offsets; determine, according to the quality assessment algorithm, distortion D" caused by each of the plurality of adjusted tone-mapping curves; and selecting any D" meeting a first condition from the plurality of D", where tone-mapping curve parameters p" and a" corresponding to the any D" are selected as adjustment targets of curve parameters p' and a', and $D_T$ is the any D" that is selected.

With reference to the eighth aspect, in some implementations of the eighth aspect, the processing unit is specifically configured to: When K is 1, the determined offset is the predicted offset of the curve parameter p plus the basic step size, and the predicted offset of the curve parameter p minus the basic step size.

With reference to the eighth aspect, in some implementations of the eighth aspect, the first condition is selecting a tone-mapping curve parameter corresponding to smaller distortion D" between two distortion D" values.

With reference to the eighth aspect, in some implementations of the eighth aspect, the processing unit is specifically configured to: determine the plurality of offsets based on the basic delta±M×basic step size, where M is each positive integer less than or equal to K.

With reference to the eighth aspect, in some implementations of the eighth aspect, the first condition is selecting a smallest D" from the plurality of D", or selecting a D" less than a first threshold from the plurality of D".

With reference to the eighth aspect, in some implementations of the eighth aspect, the processing unit is further configured to:

determine the predicted offset of the curve parameter p according to the formula (12):

$$\text{delta} = \frac{\sum_{k=1}^{M} \text{delta}C[N-k]/D[N-k]}{\sum_{k=1}^{M} 1/D[N-k]} \quad (12)$$

deltaC[N−k] represents an offset used by an $(N-k)^{th}$ frame, D[N−k] represents distortion of the $(N-k)^{th}$ frame calculated according to the quality assessment algorithm, and M is a window length.

According to a ninth aspect, an encoding device is provided. The encoding device includes at least one processor and a memory. The at least one processor is configured to perform the method in any one of the first aspect or the possible implementations of the first aspect, or is configured to perform the method in any one of the third aspect or the possible implementations of the third aspect.

According to an eleventh aspect, a decoding device is provided. The decoding device includes at least one processor and an interface circuit. The at least one processor is configured to perform the method in any one of the second aspect or the possible implementations of the second aspect, or is configured to perform the method in any one of the fourth aspect or the possible implementations of the fourth aspect.

According to a twelfth aspect, a computer program product is provided. The computer program product includes a computer program. When the computer program is executed by a processor, the computer program is used to perform the method in any one of the first aspect or the possible implementations of the first aspect, the method in any one of the second aspect or the possible implementations of the second aspect, the method in any one of the third aspect or the possible implementations of the third aspect, or the method in any one of the fourth aspect or the possible implementations of the fourth aspect.

According to a thirteenth aspect, a computer-readable storage medium is provided. The computer-readable storage medium stores a computer program. When the computer program is executed, the computer program is used to perform the method in any one of the first aspect or the possible implementations of the first aspect, the method in any one of the second aspect or the possible implementations of the second aspect, the method in any one of the third aspect or the possible implementations of the third aspect, or the method in any one of the fourth aspect or the possible implementations of the fourth aspect.

According to a fourteenth aspect, a chip is provided. The chip includes: a processor, configured to invoke a computer program from a memory and run the computer program, to enable a communication device in which the chip is installed to perform the method in any one of the first aspect or the possible implementations of the first aspect, the method in any one of the second aspect or the possible implementations of the second aspect, the method in any one of the third aspect or the possible implementations of the third aspect, or the method in any one of the fourth aspect or the possible implementations of the fourth aspect.

Optionally, the chip may further include a memory. The memory stores instructions, and the processor is configured to execute the instructions stored in the memory or other instructions.

BRIEF DESCRIPTION OF DRAWINGS

FIG. 6 is a schematic flowchart of a high dynamic range HDR video processing method according to an embodiment of this application;

FIG. 10 is a schematic flowchart of a high dynamic range HDR video processing method 600 according to an embodiment of this application;

FIG. 14A and FIG. 14B are a schematic flowchart of a high dynamic range HDR video processing method according to an embodiment of this application;

DESCRIPTION OF EMBODIMENTS

The following describes technical solutions of this application with reference to accompanying drawings.

Figure 1:
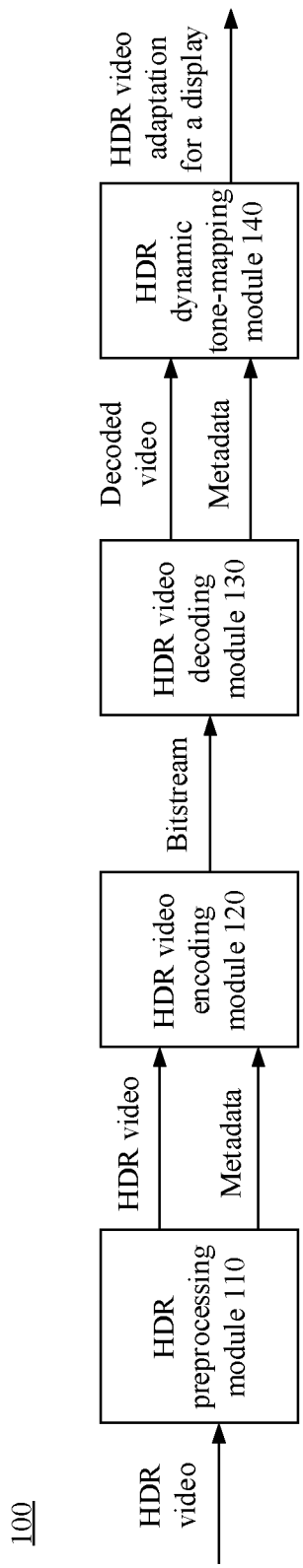
FIG. 1 is a schematic diagram of a system to which a high dynamic range HDR video processing method is applied according to an embodiment of this application.

FIG. 1 is a schematic diagram of a system 100 to which a high dynamic range HDR video processing method is applied according to an embodiment of this application. As shown in FIG. 1, an HDR end-to-end processing system generally includes four parts: an HDR preprocessing module 110, an HDR video encoding module 120, an HDR video decoding module 130, and an HDR dynamic tone-mapping module 140. The HDR preprocessing module 110 and the HDR video encoding module 120 are an encoder side, and the HDR video decoding module 130 and the HDR dynamic tone-mapping module 140 are a decoder side.

An HDR video is input to the HDR preprocessing module 110. The HDR video may be a captured video, or may be an HDR video processed by a colorist or a device according to an algorithm. Opto-electronic transfer has been performed on pixel values of the HDR video. For example, the pixel values of the HDR video are values in PQ domain.

The HDR preprocessing module 110 is responsible for extracting static metadata and dynamic metadata. If the HDR video uses a director mode, the HDR preprocessing module 110 calculates a curve parameter of tone-mapping in the director mode, and the curve parameter of tone-mapping in the director mode are written into metadata.

The HDR video encoding module 120 encodes the HDR video and the metadata, and the metadata is embedded into a user-defined part in a bitstream. The HDR video encoding module 120 may use an encoder compliant with any standard, for example, high efficiency video coding (HEVC) or the second generation digital audio and video coding standard (Audio Video Coding Standard 2, AVS2). After the HDR video encoding module completes encoding, the encoder side may transmit the bitstream to the decoder side.

The HDR video decoding module 130 on the decoder side decodes the bitstream according to a standard corresponding to a format of the bitstream, and outputs a decoded HDR video and HDR metadata.

The HDR dynamic tone-mapping module 140 calculates a tone-mapping curve based on the decoded HDR video, the metadata, and peak luminance of a display device, performs tone-mapping, and finally outputs the video to the display. If the HDR video uses the director mode, the HDR dynamic tone-mapping module directly uses the curve parameter in the metadata without calculation.

Before the HDR video is input to the HDR preprocessing module 110, opto-electronic transfer needs to be performed on the pixel values of the HDR video. Maximum luminance information of the display device cannot reach luminance information of the real world, and images are viewed on a display device. Therefore, an opto-electronic transfer function is required. To better understand opto-electronic transfer, the concept of dynamic range (Dynamic Range) needs to be introduced.

Figure 2:
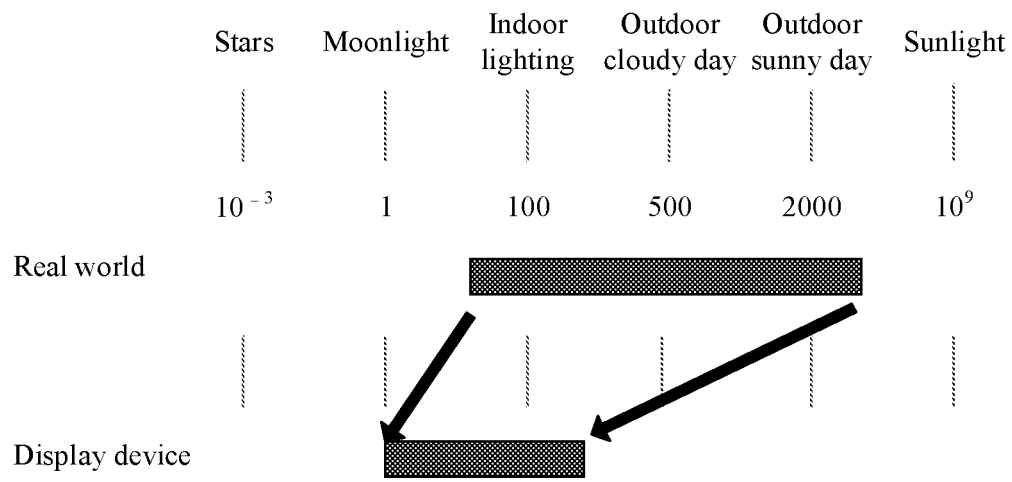
FIG. 2 is a schematic diagram of dynamic mapping.

The dynamic range indicates a ratio of a maximum value to a minimum value of a variable in many fields. For a digital image, the dynamic range is a ratio of a maximum grayscale value to a minimum grayscale value in a range in which the image can be displayed. The dynamic range in nature is quite large. A night scene under the stars has a luminance of approximately 0.001 cd/m². The sun has a luminance up to 1000000000 cd/m². Such a dynamic range achieves an order of magnitude of $1000000000/0.001=10^{13}$. However, the luminance of the sun and the luminance of the star are not obtained at the same time in nature. For natural scenes in the real world, the dynamic range is between $10^{-3}$ to $10^6$. Currently, for most color digital images, the R, G, and B channels are respectively stored by using 1 byte, that is, 8 bits. In other words, a representation range of each channel is 0-255 gray scales. Herein, 0-255 is the dynamic range of the image. A dynamic range of a same scene in the real world is within the range of $10^{-3}$ to $10^6$, and is referred to as the high dynamic range (HDR). Relatively, a dynamic range of a common image is the standard dynamic range (LDR). An imaging process of a digital camera is actually mapping from the high dynamic range of the real world to a standard dynamic range of a photo. Mapping from the high dynamic range of the real world to the standard dynamic range of the photo is usually a non-linear process. As shown in FIG. 2, FIG. 2 is a schematic diagram of dynamic mapping from a high dynamic range of a real world to a standard dynamic range of a display device. In FIG. 2, the dynamic range of the real world is about 80 to 2000, and the dynamic range mapped to the display device is about 1 to 200.

A standard dynamic range image corresponds to a high dynamic range image. An 8-bit image in a format such as jpeg that is conventionally used may be considered as a standard dynamic range image. Before a camera that can shoot an HDR image appears, a conventional camera can only record photographed light information within a specific range by controlling an exposure value. Maximum luminance information of the display device cannot reach luminance information of the real world, and images are viewed on a display device. Therefore, an opto-electronic transfer function is required. An early display device is a cathode ray tube (CRT) display, and the opto-electronic transfer function is a gamma function. The ITU-R Recommendation BT.1886 standard defines the opto-electronic transfer function based on the gamma function, as shown in formula (1).

$V=1.099L^{0.45}-0.099$ for $1 \geq L \geq 0.018$ $V=4.500$ for $0.018 > L \geq 0$ \hfill (1)

An 8-bit image after the quantization and conversion is a conventional SDR image. The SDR image and the transfer function perform well on a conventional display device (the luminance is about 100 cd/m²).

However, with the upgrade of the display device, a luminance range of the display device keeps increasing. Luminance information of an existing consumer-grade HDR display is 600 cd/m², and luminance information of a high-end HDR display can reach 2000 cd/m², which is far beyond luminance information of an SDR display device. The opto-electronic transfer function in the ITU-R Recommendation BT.1886 standard cannot well present display performance of an HDR display device. Therefore, an improved opto-electronic transfer function is required to adapt to the upgrade of the display device. Currently, there are three common opto-electronic transfer functions: perceptual quantizer (perception quantizer, PQ), hybrid log-gamma (HLG), and scene luminance fidelity (SLF). The following describes the three curves.

Figure 3:
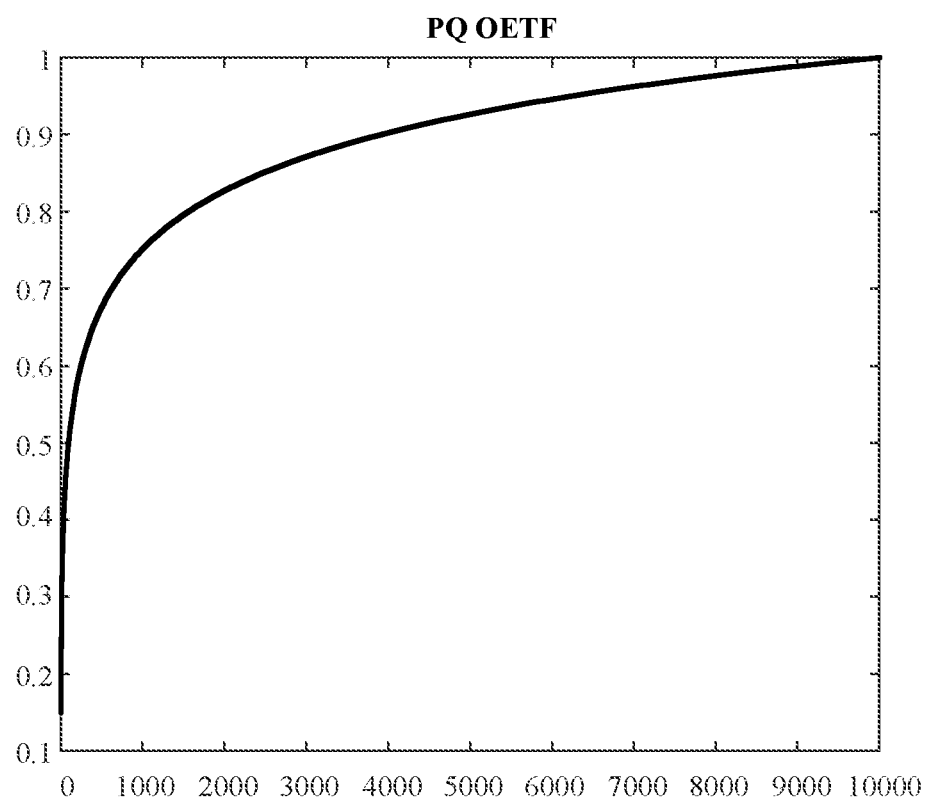
FIG. 3 is a diagram of a PQ opto-electronic transfer function.

The PQ opto-electronic transfer function herein is different from the conventional "gamma" transfer function. The perceptual quantizer transfer function is proposed based on a luminance perception model of human eyes. The PQ opto-electronic transfer function represents a conversion relationship from a linear signal value of an image pixel to a non-linear signal value in a PQ domain. For an image of the PQ opto-electronic transfer function, refer to FIG. 3. FIG. 3 shows an image of the PQ opto-electronic transfer function. The PQ opto-electronic transfer function may be expressed as the formula (2):

$$\begin{cases} R' = \text{PQ\_TF}(\max(0, \min(R/10000, 1))) \\ G' = \text{PQ\_TF}(\max(0, \min(R/10000, 1))) \\ B' = \text{PQ\_TF}(\max(0, \min(R/10000, 1))) \end{cases} \quad (2)$$

Parameters in the formula (2) may be calculated according to the formula (3):

$$L' = \text{PQ\_TF}(L) = \left(\frac{c_1 + c_2 L^{m_1}}{1 + c_3 L^{m_1}}\right)^{m_2} \quad (3)$$

L represents a linear signal value, and the value is normalized to [0, 1].

L' represents a non-linear signal value, and a range of the value is [0, 1].

$$m_1 = \frac{2610}{4096} \times \frac{1}{4} = 0.1593017578$$

125 is a PQ opto-electronic transfer coefficient.

$$m_2 = \frac{2523}{4096} \times 128 = 78.84375$$

is a PQ opto-electronic transfer coefficient.

$$c_1 = c_3 - c_2 + 1 = \frac{3424}{4096} = 0.8359375$$

is a PQ opto-electronic transfer coefficient.

$$c_2 = \frac{2413}{4096} \times 32 = 18.8515625$$

is a PQ opto-electronic transfer coefficient.

$$c_3 = \frac{2392}{4096} \times 32 = 18.6875$$

is a PQ opto-electronic transfer coefficient.

Figure 4:
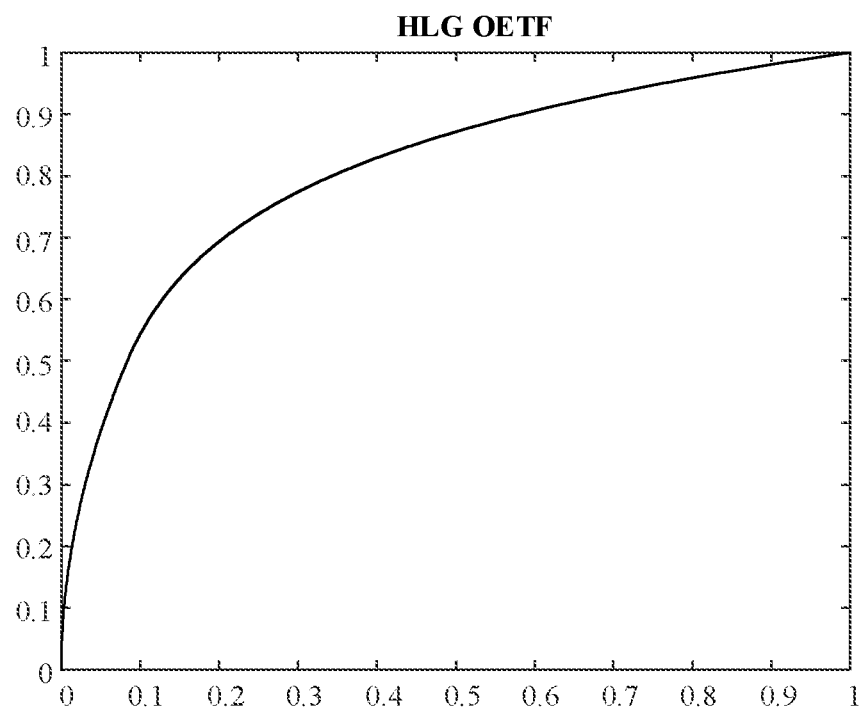
FIG. 4 is a diagram of an HLG opto-electronic transfer function.

The HLG opto-electronic transfer function is obtained by improving a conventional gamma curve. FIG. 4 is a diagram of the HLG opto-electronic transfer function. For the HLG opto-electronic transfer function, the conventional gamma curve is used in the lower half region, and a log curve is supplemented in the upper half region. The HLG opto-electronic transfer function indicates a conversion relationship between a linear signal value of an image pixel and a non-linear signal value in an HLG domain, and the HLG opto-electronic transfer function may be expressed as the formula (4):

$$L' = \text{HLG\_TF}(L) = \begin{cases} \sqrt{L}/2, & 0 \leq L \leq 1 \\ a\ln(L-b) + c, & 1 < L \end{cases} \quad (4)$$

L represents a linear signal value, and a range of the value is [0, 12].

L represents a non-linear signal value, and a range of the value is [0, 1].

a=0.17883277, which is an HLG opto-electronic transfer coefficient.

b=0.28466892, which is an HLG opto-electronic transfer coefficient.

c=0.55991073, which is an HLG opto-electronic transfer coefficient.

Figure 5:
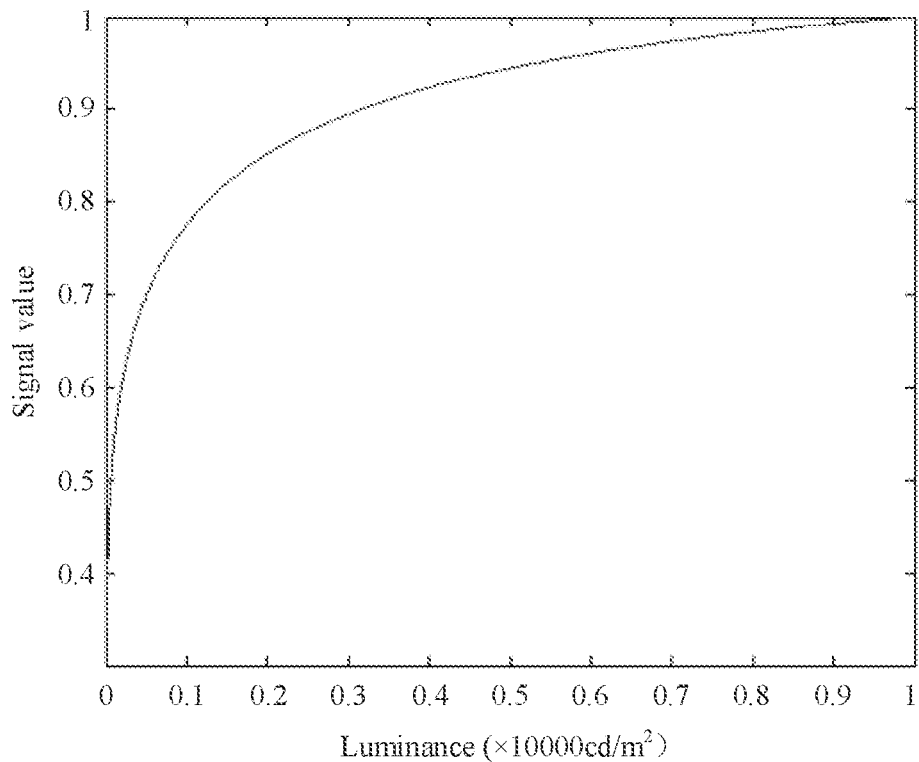
FIG. 5 is a diagram of an SLF opto-electronic transfer function.

The SLF opto-electronic transfer function is an optimal curve obtained based on luminance distribution in an HDR scene when optical characteristics of human eyes are satisfied. Refer to FIG. 5. FIG. 5 is a diagram of the SLF opto-electronic transfer function. An SLF opto-electronic transfer curve represents a conversion relationship between a linear signal value of an image pixel and a non-linear signal value in an SLF domain. The conversion relationship between a linear signal value of an image pixel and a non-linear signal value in an SLF domain is shown in the formula (5):

$$\begin{cases} R' = \text{SLF\_TF}(\max(0, \min(R/10000, 1))) \\ G' = \text{SLF\_TF}(\max(0, \min(R/10000, 1))) \\ B' = \text{SLF\_TF}(\max(0, \min(R/10000, 1))) \end{cases} \quad (5)$$

Parameters in the formula (5) may be calculated according to the formula (6):

$$L' = \text{SLF\_TF}(L) = a \times \left(\frac{p \times L}{(p-1) \times L}\right)^m + b \quad (6)$$

L represents a linear signal value, and the value is normalized to [0, 1].

L represents a non-linear signal value, and a range of the value is [0, 1].

p=2.3, which is an SLF opto-electronic transfer coefficient.

m=0.14, which is an SLF opto-electronic transfer coefficient.

a=1.12762, which is an SLF opto-electronic transfer coefficient.

b=−0.12762, which is an SLF opto-electronic transfer coefficient.

The HDR preprocessing module 110 is responsible for extracting static metadata and dynamic metadata, and adapts to a front-end HDR signal and a back-end HDR terminal display device mainly through dynamic range mapping. For example, a front end collects a 4000-nit light signal (nit, a unit of light intensity), but an HDR display capability of a back-end HDR terminal display device (TV or iPad) is only 500 nits. Therefore, how to map the 4000-nit signal to the 500-nit device is a tone-mapping process from high to low light intensity. For another example, a front end collects a 100-nit SDR signal, and a display end can display a 2000-nit TV signal. Well displaying the 100-nit signal on the 2000-nit device is another tone-mapping process from low to high.

Dynamic range mapping can be classified into static mapping and dynamic mapping. The static mapping method refers to an overall tone-mapping process of single data based on same video content or same hard disk content. That is, processing curves are the same. An advantage of this method is that less information is carried and the processing procedure is simple. A disadvantage of this method is that a same curve is used for tone-mapping in each scene. As a result, information may be lost in some scenes. For example, if the curve focuses on protecting bright regions, some details may be lost or invisible in some extremely dark scenes. This affects user experience. In the dynamic mapping method, dynamic adjustment is made based on a specific area, each scene, or content of each frame. An advantage of this method is that different curve processing may be performed based on the specific area, each scene, or each frame, and a processing result is better. A disadvantage is that each frame or each scene needs to carry related scene information, and an amount of carried information is large.

In a preprocessing process, a mode used by the HDR video is used. For example, the mode used by the HDR video is an automatic mode, or the mode used by the HDR video is a director mode. An algorithm for the automatic mode is an empirical formula obtained based on massive test data, and can cover most scenes in practice. However, in some scenes, a curve calculated in the automatic mode cannot achieve good effect. The director mode means that a director colorist manually adjusts and determines a parameter, or predicts and corrects a parameter of the automatic mode to further optimize a curve parameter to obtain the director mode. Usually, the director mode with correction can achieve good effect.

In view of this, this application proposes a high dynamic range HDR video processing method. According to the method, a mode used by an HDR video can be determined, better tone-mapping effect can be implemented.

A high dynamic range HDR video processing method provided in this application is described in detail below with reference to FIG. 6. FIG. 6 is a schematic flowchart of a high dynamic range HDR video processing method 200 according to an embodiment of this application. The method 200 may be applied to the scenario shown in FIG. 1, or certainly may be applied to another scenario in which video processing needs to be performed. This is not limited in this embodiment of this application.

It should be understood that in this embodiment of this application, the method is described by using an example in which the method is executed by an encoding device. By way of example and not limitation, the method may alternatively be executed by a chip, a chip system, a processor, or the like that is used in the encoding device.

As shown in FIG. 6, the method 200 shown in FIG. 6 may include S210 to S260. The following describes the steps in the method 200 in detail with reference to FIG. 6.

S210: An encoding device obtains dynamic metadata of an $N^{th}$ HDR video frame according to a dynamic metadata generation algorithm, where N is greater than 0. The $N^{th}$ frame of the HDR video is referred to as the $N^{th}$ HDR video frame for short.

S220: The encoding device calculates a tone-mapping (tone-mapping) curve parameter of the $N^{th}$ HDR video frame based on the dynamic metadata of the $N^{th}$ HDR video frame.

S230: The encoding device generates a tone-mapping curve based on the curve parameter.

S240: The encoding device determines, according to a quality assessment algorithm, distortion D' caused by the tone-mapping curve.

S250: The encoding device compares D' and $D_T$, to determine a mode used by the $N^{th}$ HDR video frame, where the mode is an automatic mode or a director mode, and $D_T$ is a threshold value.

S260: The encoding device determines metadata of the $N^{th}$ HDR video frame based on the determined mode used by the $N^{th}$ HDR video frame.

In the method 200, whether the mode used by the $N^{th}$ HDR video frame is the automatic mode or the director mode is determined by comparing $D_T$ and the distortion D' that is caused by the tone-mapping curve and that is determined according to the quality assessment algorithm, so that the mode used by an HDR video can be determined based on the distortion caused by the tone-mapping curve. This achieves better tone-mapping effect.

In step S210, the dynamic metadata of the $N^{th}$ HDR video frame is obtained according to the dynamic metadata generation algorithm. The dynamic metadata generally refers to basic dynamic metadata, and the basic dynamic metadata generally includes a minimum value (minimum_maxrgb_pq) of maxrgb values of all pixels in a current frame or a current scene, and an average value (average_maxrgb_pq) of the maxrgb values of all pixels in the current frame or the current scenario, (variance_maxrgb_pq) obtained by subtracting a value corresponding to a 10% quantile from a value corresponding to a 90% quantile of the maxrgb values of all pixels, and a maximum value (maximum_maxrgb_pq) of the maxrgb values of all pixels in the current frame or the current scene. The maxrgb value is a maximum value of R, G, and B components of a pixel. Note that the value here refers to a value in a PQ domain, that is, between 0 and 1.

In step S220, the tone-mapping curve parameter of the $N^{th}$ HDR video frame is calculated based on the dynamic metadata of the $N^{th}$ HDR video frame.

The tone-mapping curve parameter may be curve parameters of a plurality of types, for example, the sigmoidal-based curve proposed by Dolby, and the Bessel curve proposed by Samsung. The curve solutions proposed by Dolby and Samsung are all private solutions, and authorization needs to be obtained for specific implementation.

The tone-mapping curve parameter may also be a dynamic tone-mapping curve based on an SLF curve, and a form of the dynamic tone-mapping curve based on the SLF curve is shown by the formula (7):

$$L' = F(L) = a \times \left(\frac{p \times L}{(p-1) \times L}\right)^m + b \tag{7}$$

A value of a ranges from 0.0 to 1.0, a value of b ranges from 0.0 to 1.0, and values of p and m range from 0.1 to 60. L' represents output luminance, for example, may be a rational number ranging from 0.0 to 1.0. L represents input luminance, for example, may be a rational number ranging from 0.0 to 1.0. The curve form is not flexible enough to provide more diversified forms. Specifically, the curve may be only in C, reverse S, and reverse C shapes, and a positive S shape cannot be provided. If the image is in a high contrast scene, a positive S-shaped curve is required.

The tone-mapping (tone-mapping) curve parameter may also be a tone-mapping curve form shown in the formula (8). As shown in the formula (8):

$$L' = F(L) = a \times \left(\frac{p \times L^n}{(p-1) \times L^n + 1}\right)^m + b \tag{8}$$

A value of a ranges from 0.0 to 1.0, a value of b ranges from 0.0 to 1.0, and values of p, n, and m range from 0.1 to 60. L' represents output luminance, for example, may be a rational number ranging from 0.0 to 1.0. L represents input luminance, for example, may be a rational number ranging from 0.0 to 1.0.

Specific values of a, b, p, n, and m are determined based on dynamic key information, for example, dynamic metadata, of a specific area, each frame, or each scene. a is mainly related to a maximum luminance value in a scene, a maximum parameter of a photographing device in the scene, or a maximum display capability of a display device. b is related to a minimum value in the scene and a minimum display capability of the display device. P, n, and m are related to an overall style of the scene.

In the formula, $$a = \frac{\text{Maximum value of a display device} - \text{Minimum value of the display device}}{F\left(\begin{array}{c}\text{Maximum value in a scene or} \\ \text{maxmimum value of a photographing device}\end{array}\right) - F\left(\begin{array}{c}\text{Minimum value in the scene or} \\ \text{minimum value of the photographing device}\end{array}\right)}$$

$$b = \text{Minimum value of the display device} - F\left(\begin{array}{c}\text{Minimum value in the scene or} \\ \text{minimum value of the photographing device}\end{array}\right)$$

Usually, m is fixed at 2.4, n is fixed at 1, and b is fixed at the minimum luminance of the display. Only the parameters a and p need to be calculated. p is used to adjust the luminance and curve height. A larger value of p indicates a higher curve. The parameter a is used to limit the maximum value of the curve. The value cannot exceed the maximum value of the display device. The maximum value of the display device is a constant. Therefore, once the parameter p is determined, the parameter a can be calculated based on p.

In step S230, the encoding device generates a tone-mapping curve in the automatic mode based on the tone-mapping curve parameter in the automatic mode.

In step S240, the encoding device determines, according to a quality assessment algorithm, distortion D' caused by the tone-mapping curve in the automatic mode. The quality assessment algorithm may also be referred to as a quality assessment model. Currently, the most cutting-edge HDR image quality assessment models are [1] and [2] ([1] is HDR-VDP-2.2: A Calibrated Method for Objective Quality Prediction of High Dynamic Range and Standard Images (HDR-VDP-2.2: A Calibrated Method for Objective Quality Prediction of High Dynamic Range and Standard Images, Manish Narwaria, Rafal K. Mantiuk, Mattheiu Perreira Da Silva and Patrick Le Callet. In: Journal of Electronic Imaging, 24(1), 2015). [2] is Dynamic Range Independent Image Quality Assessment (Dynamic Range Independent Image Quality Assessment, Tunç O. Aydin, Rafal Mantiuk, Karol Myszkowski, Hans-Peter Seidel. In: ACM Transactions on Graphics (Proc. of SIGGRAPH'08), 27(3), article no. 69, 2008). Based on the HVS and the sensitivity of the HVS to different luminance and spatial frequencies, a perceptual error of a local contrast at each pixel position of two images before and after tone-mapping is calculated. If the probability is 0, it indicates that human eyes cannot perceive the difference, and the image quality after tone-mapping is good. If the probability is 1, it indicates that human eyes can perceive the difference, and the image quality after tone-mapping is poor. Because luminance and spatial frequencies at all pixels are different, and tone-mapping results are also different, each pixel corresponds to a perceptual error. Finally, perceptual errors of all pixels are superimposed together to obtain an average perceptual error Q of the entire image.

An input of the quality assessment model is an original image before tone-mapping, and an output is a result image after tone-mapping. Both are values in the linear field and in a unit of nit. The output Q of the model represents quality loss and can be normalized to a value between 0 and 1. A larger output value indicates poorer image quality. 0 indicates that each pixel has no loss and the image quality is the highest. 1 indicates that each pixel has obvious perception errors and the image quality is the lowest.

In step S250, the encoding device compares D' and $D_T$, to determine a mode used by the $N^{th}$ HDR video frame, where the mode is an automatic mode or a director mode, and $D_T$ is a threshold value.

For clearer understanding of this application, the following describes the automatic mode and the director mode.

The automatic mode is a non-director mode, for example, a non-manual intervention mode or a non-manual interference mode. The automatic mode may also be referred to as a tone-mapping mode without manual intervention. A curve parameter in the automatic mode is calculated based on the basic dynamic metadata. Color-related dynamic metadata may be available in the automatic mode, but is not mandatory.

The director mode in a general sense means that a director colorist manually makes adjustment and determines a parameter. This is only one case of the director mode in this application. The director mode in this application further includes calculating a curve parameter by using an algorithm. Calculating the curve parameter by using the algorithm is equivalent to replacing the director and the colorist for parameter adjustment. Therefore, it is also the director mode in a broad sense. The basic dynamic metadata in the director mode still needs to be transmitted. Parameters of a curve may be manually adjusted by a colorist or calculated by using a computer algorithm. In addition to parameters of a basic curve, parameters of cubic splines, such as TH1, TH2, TH3, TH strength, also need to be manually adjusted or calculated by using an algorithm. These parameters are also embedded in the dynamic metadata and transmitted to a decoding device. The decoding device directly uses these parameters to generate the tone-mapping curve based on the display capability. Appropriate adjustment may also be made. Similarly, color-related dynamic metadata may be available, but is not mandatory.

Therefore, an essential difference between the automatic mode and the director mode is as follows: In the automatic mode, only basic dynamic metadata is transmitted, and a decoder side is required to calculate curve parameters by itself, to generate a curve. In the director mode, curve parameters are calculated in advance on a production side or an encoder side, and are transmitted to a decoder side as a part of the dynamic metadata. The decoder side may directly use these parameters to generate a curve.

$D_T$ is the distortion of the $N^{th}$ HDR video frame in the director mode, and comparing D' and $D_T$ to determine the mode used by the $N^{th}$ HDR video frame includes: determining that the $N^{th}$ HDR video frame uses the director mode when D' is greater than $D_T$; or determining that the $N^{th}$ HDR video frame uses the automatic mode when D' is less than or equal to $D_T$.

In step S260, the encoding device determines metadata of the $N^{th}$ HDR video frame based on the determined mode used by the $N^{th}$ HDR video frame.

The metadata includes a flag bit, and the flag bit indicates that the mode used by the $N^{th}$ HDR video frame is the director mode, or the flag bit indicates that the mode used by the $N^{th}$ HDR video frame is the automatic mode. For example, in the automatic mode, the bitstream flag bit tone mapping mode=0, and in the director mode, the bitstream flag bit tone_mapping_mode=1.

The method may further include: obtaining an offset deltaC[N] of the tone-mapping curve parameter of the $N^{th}$ HDR video frame based on metadata of (N–M, N) frames in an M-frame window, the tone-mapping curve parameter, and D', where N is greater than 0. Step S260 may be specifically: generating the metadata of the $N^{th}$ HDR video frame based on the mode used by the $N^{th}$ HDR video frame, the dynamic metadata generation algorithm, and the offset deltaC[N] of the tone-mapping curve parameter.

The method may further include: generating an adjusted tone-mapping curve according to the deltaC[N]; and determining distortion $D_T$ caused by the adjusted tone-mapping curve according to the quality assessment algorithm.

The method may be applied to any one or more of the following preset configuration parameters: 1000-nit, 500-nit, and a standard dynamic range SDR.

It should be understood that the preset configuration parameter is merely used as an example, and does not constitute any limitation on this application. For example, the preset configuration parameter may alternatively be 900-nit, 400-nit, or the like.

For clearer understanding of this application, the following describes the method in this application in detail with reference to the form of the tone-mapping curve shown in the foregoing formula (8).

Figure 7:
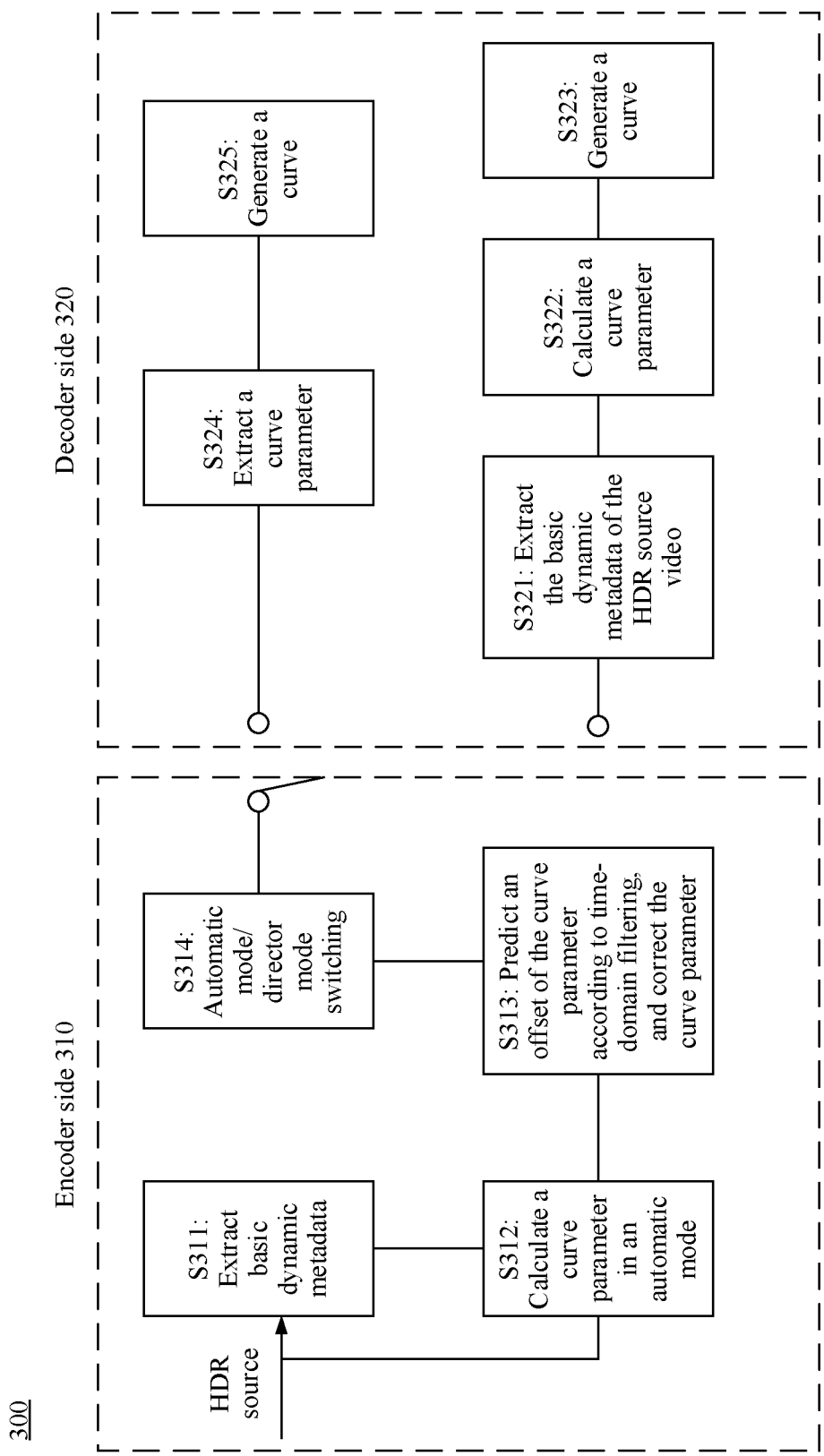
FIG. 7 is a schematic block diagram of a system to which a high dynamic range HDR video processing method is applied according to this application.

FIG. 7 is a schematic block diagram of a system to which a high dynamic range HDR video processing method is applied according to this application. As shown in FIG. 7, the method may be applied to a system including an encoder side 310 and a decoder side 320.

The encoder side 310 may perform the following four steps: S311: The encoder side 310 extracts basic dynamic metadata of an HDR source video according to a dynamic metadata extraction algorithm; S312: The encoder side 310 calculates a curve parameter in an automatic mode according to the basic dynamic metadata; S313: The encoder side 310 predicts an offset of the curve parameter according to time-domain filtering, and corrects the curve parameter according to a quality evaluation algorithm; and S314. The encoder side 310 switches between an automatic mode and a director mode based on tone-mapping curve distortion of the corrected curve parameter and tone-mapping curve distortion of the curve parameter in the automatic mode.

When obtaining a bitstream transmitted by the encoder side, the decoder side 320 needs to determine, according to a flag bit in the metadata in the bitstream, a mode used by the HDR video in the bitstream. The decoder side 320 may perform two branch steps according to different modes used by the HDR video.

If the HDR video uses the automatic mode in the bitstream, the following steps may be performed:

S321: The decoder side 320 extracts the basic dynamic metadata of the HDR source video according to the dynamic metadata extraction algorithm. S322: The decoder side 320 calculates a curve parameter based on the basic dynamic metadata.

S323: The decoder side 320 generates a curve based on the curve parameter of the basic dynamic metadata.

If the HDR video uses the director mode in the bitstream, the following steps may be performed:

S324: The decoder side 320 extracts a curve parameter from the metadata.

S325: The decoder side 320 generates a curve according to the extracted curve parameter.

After generating the curve parameter, the decoder side 320 performs display adaptation based on the decoded HDR video, and displays the HDR video.

Figure 8A:
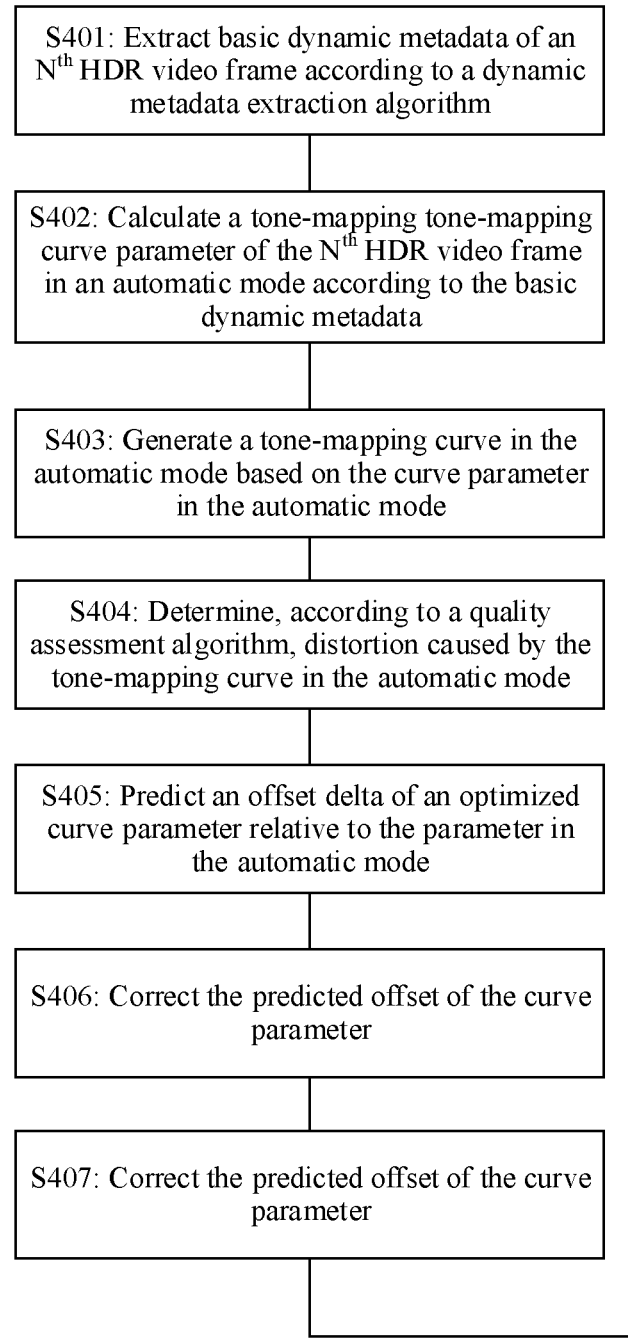
FIG. 8A and FIG. 8B are a schematic diagram of a system for a high dynamic range HDR video processing method according to an embodiment of this application.
Figure 8B:
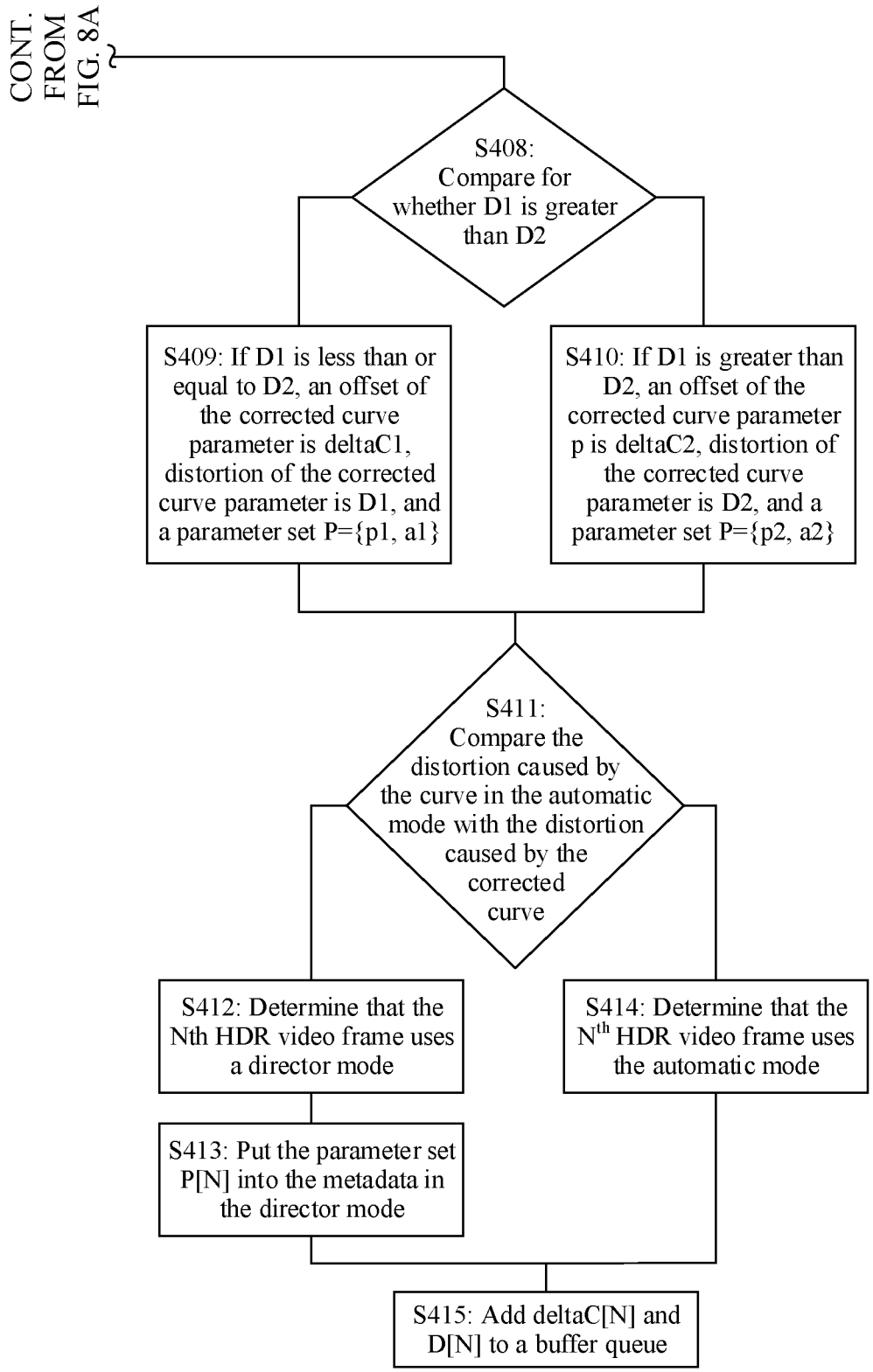

The following describes the method in this application in detail with reference to the form of the tone-mapping (tone-mapping) curve shown in the foregoing formula (8). FIG. 8A and FIG. 8B are a schematic flowchart of a high dynamic range HDR video processing method 400 according to an embodiment of this application. The method 400 may be applied to the scenario shown in FIG. 1 or FIG. 7, or certainly may be applied to another scenario in which video processing needs to be performed. This is not limited in this embodiment of this application.

It should be understood that in this embodiment of this application, the method is described by using an example in which the method is executed by an encoding device. By way of example and not limitation, the method may alternatively be executed by a chip, a chip system, a processor, or the like that is used in the encoding device.

As shown in FIG. 8A and FIG. 8B, the method 400 shown in FIG. 8A and FIG. 8B may include S401 to S415. The following describes the steps in the method 400 in detail with reference to FIG. 8A and FIG. 8B.

S401: An encoding device extracts basic dynamic metadata of an $N^{th}$ HDR video frame according to a dynamic metadata extraction algorithm.

S402: The encoding device calculates tone-mapping (tone-mapping) curve parameters p' and a' of the $N^{th}$ HDR video frame in an automatic mode based on the basic dynamic metadata.

The following specifically describes how to generate the tone-mapping (tone-mapping) curve parameters p' and a' of the $N^{th}$ HDR video frame in the automatic mode that are calculated based on the basic dynamic metadata.

A process of updating the maximum luminance correction value max_lum of a to-be-processed frame, that is, the $N^{th}$ frame, is described first.

(1) Convert a maximum display luminance value max_display_mastering_luminance into PQ domain to obtain a display luminance range MaxRefDisplay of a reference display device.

(2) Substitute maximum_maxrgb, average maxrgb, and variance_maxrgb in the metadata according to formula (9) to calculate a maximum luminance reference value MAX1 of the to-be-processed frame:

$$\text{MAX1} = \begin{array}{l} B \times \text{maximum\_maxrgb} + A \times (2 \times \text{average\_maxrgb}) \\ +(1 - A - B) * (2 \times \text{variance\_maxrgb}) \end{array} \quad (9)$$

A and B are weight coefficients. A is a function of average_maxrgb, and A=(1−B)×(1−F(average_maxrgb/maximum_maxrgb)). F(x) is a constant function. A and B are ⅓ by default.

(3) Determine a final maximum luminance correction value according to the formula (10):

$$\text{max\_lum} = \begin{cases} \text{MaxRefDisplay} & \text{MAX1} > \text{MaxRefDisplay} \\ \text{MAX1} & \text{MAX1} \geq \text{MIN \&\& MAX1} \leq \text{MaxRefDisplay} \\ \text{MIN} & \text{MAX1} < \text{MIN} \end{cases} \quad (10)$$

Second, the tone-mapping (tone-mapping) curve parameters p' and a' in the automatic mode are described.

(1) Respectively set m and n to preset values 2.4 and 1. After the foregoing parameters are preset, the curve changes to:

$$\left( \frac{m\_p \times L}{(m\_p - 1) \times L + 1} \right)^{2.4}$$

(2) Set b to MinDisplay.

(3) Calculate p by substituting formula (11) into average maxrgb(avgL) in the metadata:

$$p = \begin{cases} p_{valueH} & avgL > TPH \\ p_{valueH} \times g0(W0) + p_{valueL} \times \left(1 - g\left(\frac{avgL - TPL}{TPH - TPL}\right)\right) & avgL \geq TPL, avgL \leq TPH \\ p_{valueL} & avgL < TPL \end{cases} \quad (11)$$

In the formula:

$$w0 = \left( \frac{avgL - TPL0}{TPH0 - TPL0} \right),$$

PvalueH0, PvalueL0, TPH0, and TPL0 are preset values, and are 3.5, 4.0, 0.6, and 0.3 by default. g0( ) is y=xN, and y is equal to x by default.

(4) Update p' by using the maximum luminance correction value max_lum according to the formula (12):

$$\begin{cases} p + p_{deltaH1} & \max\_lum > TPH1 \\ p + p_{deltaH1} \times g1(w1) + p_{deltaL1} \times (1 - g1(w1)) & TPL1 \le \max\_lum \le TPH1 \\ p + p_{deltaL1} & \max\_lum < TPL1 \end{cases} \quad (12)$$

$$w1 = \left(\frac{\max\_lum - TPL1}{TPH1 - TPL1}\right)$$

PdeltaH1, PdeltaL1, TPH1, and TPL1 are preset values, and are 0.6, 0.0, 0.9, and 0.75 by default. g11( ) is y=xN, and y is equal to x by default.

(5) Obtain H(L) according to p, m, n, b, K1, K2 and K3, as shown in the formula (13):

$$H(L) = \left(\frac{p \times L^n}{(K1 \times p - K2) \times L^n + K3}\right)^m \quad (13)$$

Therefore, the parameter a' is determined according to the formula (14):

$$a' = (\text{MaxDISPLAY} - \text{MinDISPLAY})/(H(\text{MaxSource}) - H(\text{MinSource})) \quad (14)$$

MaxSource is equal to the maximum luminance correction value max_lum (PQ domain) of the to-be-processed frame, and MinSource is equal to the minimum luminance min_lum (PQ domain) of the to-be-processed frame.

S403: The encoding device generates a tone-mapping curve in the automatic mode based on the curve parameters p' and a' in the automatic mode.

S404: The encoding device determines, according to a quality assessment algorithm, distortion D' caused by the tone-mapping curve in the automatic mode.

In this step, the encoding device generates the tone-mapping curve in the automatic mode based on the curve parameters p' and a' in the automatic mode, to perform tone-mapping, and inputs two images before and after tone-mapping to a quality assessment model, to calculate the subject distortion D'.

S405: The encoding device predicts an offset delta of an optimal curve parameter relative to the parameter p' in the automatic mode by using a time-domain filtering method. The offset of the optimized curve parameter relative to the parameter p' in the automatic mode may be predicted according to the formula (15):

$$\text{delta} = \frac{\sum_{k=1}^{M} \text{deltaC}[N-k]/D[N-k]}{\sum_{k=1}^{M} 1/D[N-k]} \quad (15)$$

deltaC[N−k] represents an offset used by an (N−k)$^{th}$ frame, D[N−k] represents subjective distortion that is of the (N−k)$^{th}$ frame and that is calculated by using the quality model, and k=1, 2, . . . , M. M is a queue length in a buffer. A larger value of M indicates that more historical data is used and a filtering result is smoother. A smaller value of M indicates that used historical data is closer to the current frame and can better reflect a change trend. In an extreme case, M=1 is fixed. This is equivalent to predicting the current frame by using the previous frame, where delta=deltaC[N−1]. The recommended maximum value of M ranges from 4 to 8.

Usually, there is a deviation between the predicted offset delta and the optimal offset value. Therefore, the predicted offset delta needs to be corrected, so that the corrected value can be closer to the optimal value. Based on delta, two delta correction values are calculated by increasing a step and decreasing a step respectively, and the two correction values are compared for lower distortion. Refer to step S406 and step S407.

S406: The encoding device corrects the predicted offset of the curve parameter p', where the offset of the corrected curve parameter p' is the predicted offset of the curve parameter p minus a basic step size, that is, deltaC1=delta−stepsize, and recommended stepsize is 0.1 for the parameter p'; determines an adjusted curve parameter p1 based on the curve parameter p' in the automatic mode and the offset of the corrected curve parameter p', where p1=p+deltaC1, that is, a1 is calculated according to p1; generates an adjusted tone-mapping curve according to the parameter p1 and a1; and determines, according to the quality assessment algorithm, distortion D1 caused by each tone-mapping curve among the plurality of adjusted tone-mapping curves.

S407: The encoding device corrects the predicted offset of the curve parameter p', where the offset of the corrected curve parameter p' is the predicted offset of the curve parameter p' plus the basic step size, that is, deltaC2=delta+stepsize; determines an adjusted curve parameter p2 based on the curve parameter p' in the automatic mode and the offset of the corrected curve parameter p', that is, calculates a2 according to p2; generates an adjusted tone-mapping curve according to the parameter p2 and a2; and determines, according to the quality assessment algorithm, distortion D2 caused by each tone-mapping curve among the plurality of adjusted tone-mapping curves.

In this embodiment of this application, the correction value is calculated only twice because the quality assessment model needs to be calculated once each time a correction value is tested and a calculation amount of the quality assessment model is large. Therefore, in this embodiment of this application, it is limited that the correction value is calculated twice. In this way, it cannot be ensured that an optimal value is obtained for each frame. However, a value closer to the optimal value (by a step) may be obtained on the basis of the predicted value, so that the predicted value gradually converges to a value close to the optimal value as time elapses.

S408: The encoding device compares D1 and D2.

S409: If D1 is less than or equal to D2, an offset of the corrected curve parameter p' is deltaC1, distortion of the corrected curve parameter DT=D1, and a parameter set P={p1, a1}.

S410: If D1 is greater than D2, an offset of the corrected curve parameter p is deltaC2, distortion of the corrected curve parameter DT=D2, and a parameter set P={p2, a2}.

The predicted and corrected curve parameters corresponding to deltaC are better than those in the automatic mode in most cases, but not necessarily in all cases. Therefore, comparison needs to be made. If the automatic mode is better, the $N^{th}$ frame uses the automatic mode. If the predicted and corrected values are better, the current frame uses the director mode.

S411: Compare the distortion D' caused by the tone-mapping curve in the automatic mode with the distortion $D_T$ of the corrected curve parameter.

S412: Determine that the $N^{th}$ HDR video frame uses the director mode when D' is greater than $D_T$, where a curve parameter of the $N^{th}$ frame P[N]=P, distortion D[N]=DT, and an offset deltaC[N]=deltaC.

S413: Put the parameter set P[N] into the metadata in the director mode.

S414: Determine that the $N^{th}$ HDR video frame uses the automatic mode when D' is less than or equal to $D_T$, where the curve parameter of the $N^{th}$ frame P[N]=P', the distortion D[N]=D', and the offset deltaC[N]=0. P[N] does not need to be put in dynamic metadata and transmitted to a decoder side in the automatic mode. Only basic dynamic metadata needs to be transmitted. The decoder side can calculate the value of P[N] based on a standard algorithm.

S415: Add deltaC[N] and D[N] to a buffer queue to predict a parameter offset of a next frame or next multiple frames f(N+j), where j is greater than or equal to 1 and less than or equal to M. It should be noted that the queue herein refers to a queue used for time-domain filtering above. The first in first out rule is used for the queue. If the queue is full, the head of the queue is removed each time, and then new data is added to the end of the queue.

The encoder side sends the bitstream to the decoder side. It should be understood that sending may also be understood as storing in a storage medium. For example, the encoder side may burn the bitstream into an optical disc, and the decoder side reads the bitstream in the optical disc.

In this embodiment of this application, based on the automatic mode, the curve parameter is optimized by using the quality assessment model as a standard, so that better tone-mapping effect can be achieved. In this embodiment of this application, the quality assessment model is calculated for three times per frame, with one time for the automatic mode, and two times for the correction process. The calculation amount is controllable. Switching between the automatic mode and the director mode ensures that a better curve parameter is used.

Figure 9A:
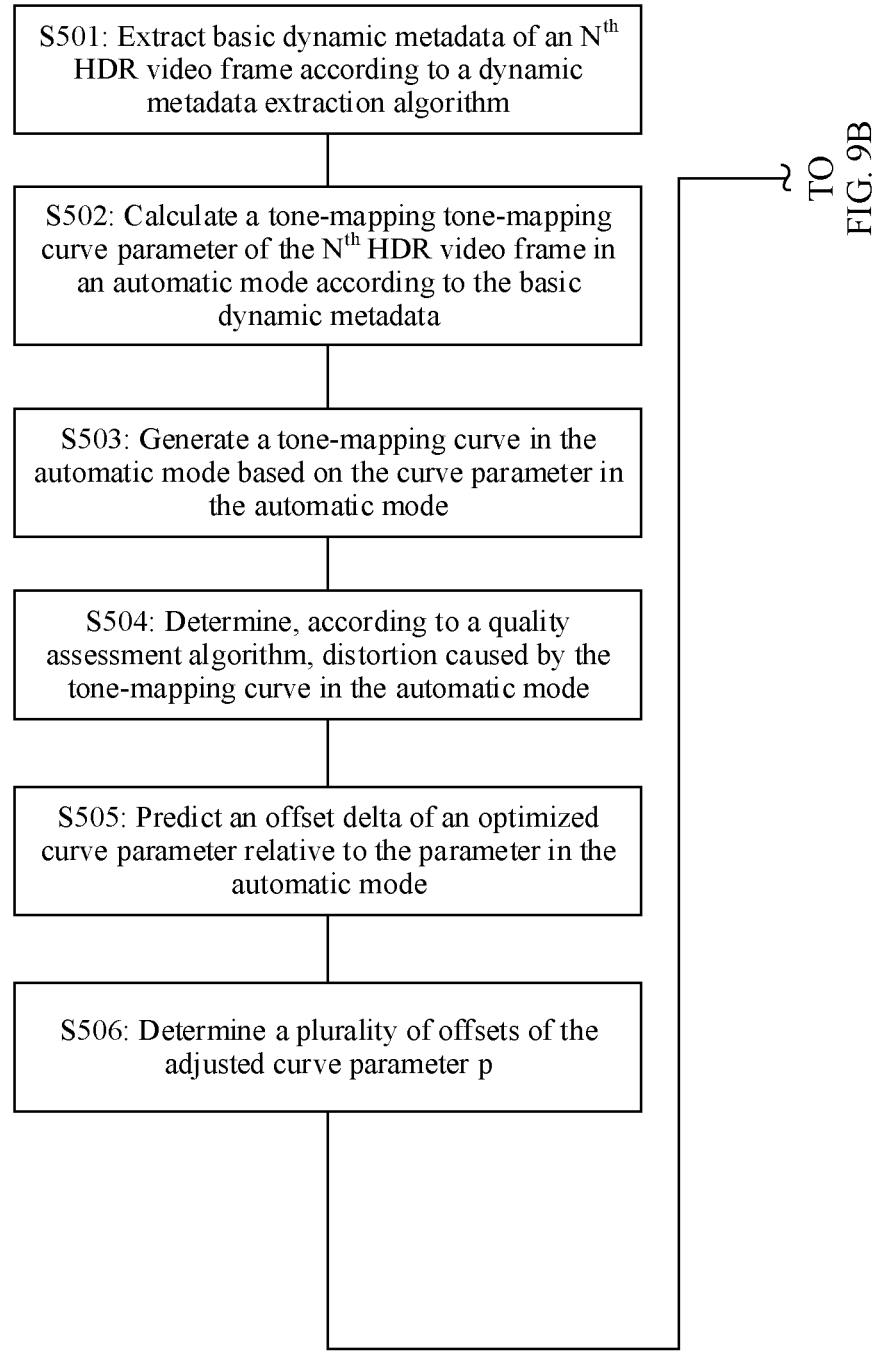
FIG. 9A and FIG. 9B are a schematic flowchart of a high dynamic range HDR video processing method according to an embodiment of this application.
Figure 9B:
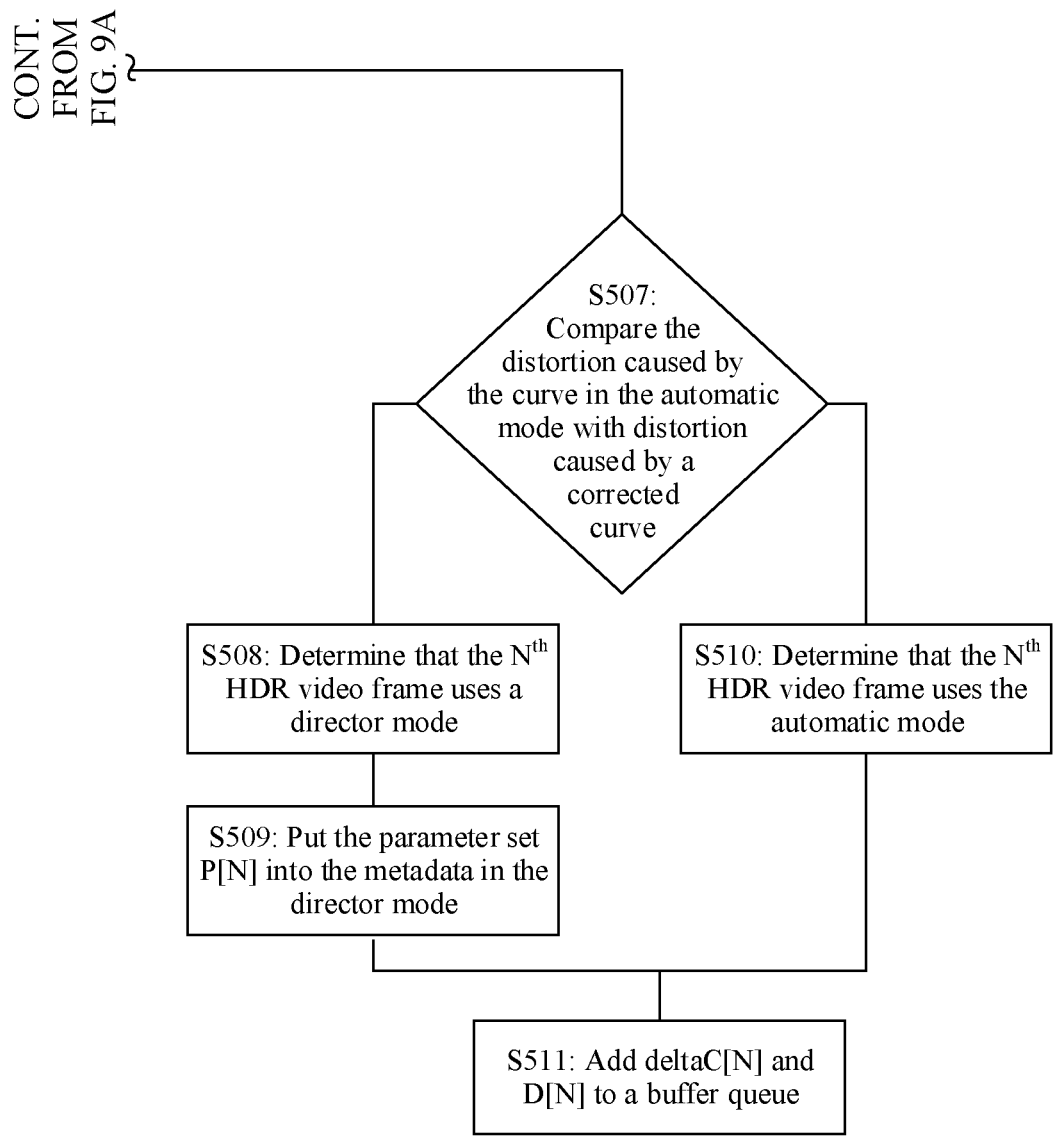

The following describes the method in this application in detail with reference to the form of the tone-mapping curve shown in the foregoing formula (8). FIG. 9A and FIG. 9B are a schematic flowchart of a high dynamic range HDR video processing method 500 according to an embodiment of this application. The method 500 may be applied to the scenario shown in FIG. 1 or FIG. 7, or certainly may be applied to another scenario in which video processing needs to be performed. This is not limited in this embodiment of this application.

It should be understood that in this embodiment of this application, the method is described by using an example in which the method is executed by an encoding device. By way of example and not limitation, the method may alternatively be executed by a chip, a chip system, a processor, or the like that is used in the encoding device.

As shown in FIG. 9A and FIG. 9B, the method 500 shown in FIG. 9A and FIG. 9B may include S501 to S511. The following describes the steps in the method 500 in detail with reference to FIG. 9A and FIG. 9B.

S501: An encoding device extracts basic dynamic metadata of an $N^{th}$ HDR video frame according to a dynamic metadata extraction algorithm.

S502: The encoding device calculates tone-mapping (tone-mapping) curve parameters p' and a' of the $N^{th}$ HDR video frame in an automatic mode based on the basic dynamic metadata.

S503: The encoding device generates a tone-mapping curve in the automatic mode based on the curve parameters p' and a' in the automatic mode.

S504: The encoding device determines, according to a quality assessment algorithm, subjective distortion D' caused by the tone-mapping curve in the automatic mode.

S505: The encoding device predicts an offset delta of an optimal curve parameter relative to the parameter p in the automatic mode by using a time-domain filtering method.

S506: Determine a plurality of offsets of the adjusted curve parameter p based on a predicted offset delta of the curve parameter p and K×basic step size, where K is a positive integer greater than or equal to 0; determine, based on the plurality of offsets of the curve parameter p, curve parameters p" and a" corresponding to each of the plurality of offsets of the curve parameter p; generate a plurality of adjusted tone-mapping curves based on the parameters p" and a" corresponding to each of the plurality of offsets; determine, according to the quality assessment algorithm, distortion D" caused by each of the plurality of adjusted tone-mapping curves; and select any D" meeting a first condition from the plurality of D", where tone-mapping curve parameters p" and a" corresponding to the any D" are selected as adjustment targets of curve parameters p' and a', and $D_T$ is the selected D".

In an implementation, determining a plurality of offsets of the adjusted curve parameter p based on a predicted offset of the curve parameter p and K×basic step size includes: determining the plurality of offsets based on the basic delta±M×basic step size, where M is each positive integer less than or equal to K.

In an implementation, the first condition is selecting a D" less than a first threshold from the plurality of D", for example, the first threshold is 0.3. Alternatively, the first condition may be selecting a smallest D" from the plurality of D".

Specifically, after the predicted offset delta is obtained, an exhaustive method may be used to search for a better offset. In the exhaustive search, K is an integer. For example, if K is 3, seven different values delta−3×stepsize, delta−2×stepsize, delta−stepsize, delta, delta+stepsize, delta+2×stepsize, delta+3×stepsize are searched for, and the one with the minimum subjective distortion is selected. The offset is recorded as deltaC, the parameter p=P'+deltaC, a is calculated by using p, a parameter set P={p, a}, and the corresponding subjective distortion is recorded as DT.

The predicted and corrected curve parameters corresponding to deltaC are better than those in the automatic mode in most cases, but not necessarily in all cases. Therefore, comparison needs to be made. If the automatic mode is better, the $N^{th}$ frame uses the automatic mode. If the predicted and corrected values are better, the current frame uses the director mode.

S507. Compare Wand $D_T$.

S508: Determine that the $N^{th}$ HDR video frame uses the director mode when D' is greater than $D_T$, where a curve parameter of the $N^{th}$ frame P[N]=P, distortion D[N]=DT, and an offset deltaC[N]=deltaC.

S509: Put the parameter set P[N] into the metadata in the director mode.

S510: Determine that the $N^{th}$ HDR video frame uses the automatic mode when D' is less than or equal to $D_T$, where the curve parameter of the $N^{th}$ frame P[N]=P', the distortion D[N]=D', and the offset deltaC[N]=0. P[N] does not need to be put in dynamic metadata and transmitted to a decoder side in the automatic mode. Only basic dynamic metadata needs to be transmitted. The decoder side can calculate the value of P[N] based on a standard algorithm.

S511: Add deltaC[N] and D[N] to a buffer queue to predict a parameter offset of a next frame f(N+1). It should be noted that the queue herein refers to a queue used for time-domain filtering in the third step. The first in first out rule is used for the queue. If the queue is full, the head of the queue is removed each time, and then new data is added to the end of the queue.

It should be understood that the method 501 to 505 corresponds to the method 401 to 405, and the method 507 to 511 corresponds to the method 411 to 415. Therefore, for related descriptions of the method 501 to 505 and the method 507 to 511, refer to the method 401 to 405 and the method 411 to 415. To avoid repetition, details are not described herein again.

In this embodiment of this application, based on the automatic mode, the curve parameter is optimized by using the quality assessment model as a standard, so that better tone-mapping effect can be achieved. When computing resources are sufficient, the optimal parameter is searched for by using the exhaustive method. This improves the effect to a maximum extent. Switching between the automatic mode and the director mode ensures that a better curve parameter is used.

FIG. 10 is a schematic flowchart of a high dynamic range HDR video processing method 600 according to an embodiment of this application. The method 600 may be applied to the scenario shown in FIG. 1 or FIG. 7, or certainly may be applied to another scenario in which video processing needs to be performed. This is not limited in this embodiment of this application.

It should be understood that in this embodiment of this application, the method is described by using an example in which the method is executed by a decoding device. By way of example and not limitation, the method may alternatively be executed by a chip, a chip system, a processor, or the like that is used in the decoding device.

As shown in FIG. 10, the method 600 shown in FIG. 10 may include S610 to S620. The following describes the steps in the method 600 in detail with reference to FIG. 10.

S610: A decoding device obtains an $N^{th}$ HDR video frame and metadata of the $N^{th}$ HDR video frame.

S620: The decoding device determines, according to a flag bit in the metadata, a mode used by the $N^{th}$ HDR video frame.

In an implementation, when the flag bit indicates that the mode used by the $N^{th}$ HDR video frame is an automatic mode, the method further includes: calculating a tone-mapping (tone-mapping) curve parameter in the automatic mode based on the metadata of the $N^{th}$ HDR video frame; generating a tone-mapping curve in the automatic mode based on the tone-mapping (tone-mapping) curve parameter; and displaying the $N^{th}$ HDR video frame based on the tone-mapping curve in the automatic mode and the $N^{th}$ HDR video frame.

In an implementation, when the flag bit indicates that the mode used by the $N^{th}$ HDR video frame is a director mode, the method further includes: extracting a tone-mapping (tone-mapping) curve parameter in the director mode from the dynamic metadata; generating a tone-mapping curve in the director mode based on the curve parameter; and displaying the $N^{th}$ HDR video frame based on the tone-mapping curve in the director mode and the $N^{th}$ HDR video frame.

In the foregoing embodiment of this application, it is described that the encoding device needs to switch between the automatic mode and the director mode. However, there is a high probability that a predicted and corrected parameter curve is better than that in the automatic mode. Therefore, the automatic mode may be omitted, to reduce system complexity. In addition, calculation of subjective distortion in the automatic mode may also be omitted if the automatic mode is omitted. Therefore, this application further provides an embodiment in which the encoding device does not switch between the automatic mode and the director mode, and always uses the director mode.

Figure 11:
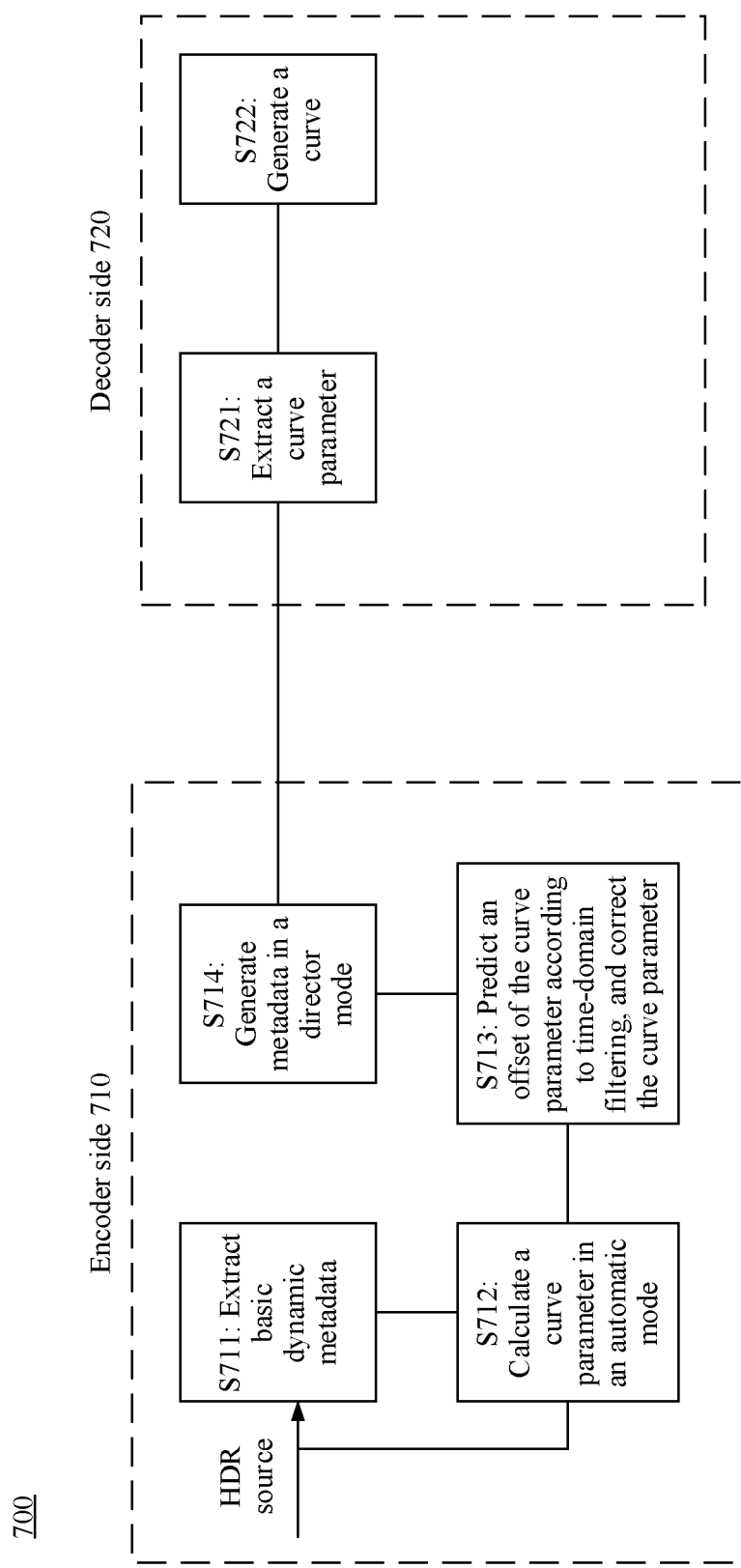
FIG. 11 is a schematic block diagram of a system to which a high dynamic range HDR video processing method is applied according to this application.

FIG. 11 is a schematic block diagram of a system to which a high dynamic range HDR video processing method is applied according to this application. As shown in FIG. 11, the method may be applied to a system including an encoder side 710 and a decoder side 720.

The encoder side 710 may perform the following four steps: S711: The encoder side 710 extracts basic dynamic metadata of an HDR source video according to a dynamic metadata extraction algorithm; S712: The encoder side 710 calculates a curve parameter in an automatic mode based on the basic dynamic metadata; S713: The encoder side 710 predicts an offset of the curve parameter according to time-domain filtering, and corrects the curve parameter according to a quality assessment algorithm; and S714: The encoder side 710 generates metadata in a director mode.

S721: The decoder side 720 extracts a curve parameter from the metadata.

S722: The decoder side 720 generates a curve according to the extracted curve parameter.

After generating the curve parameter, the decoder side 720 performs display adaptation based on the decoded HDR video, and displays the HDR video.

Figure 12:
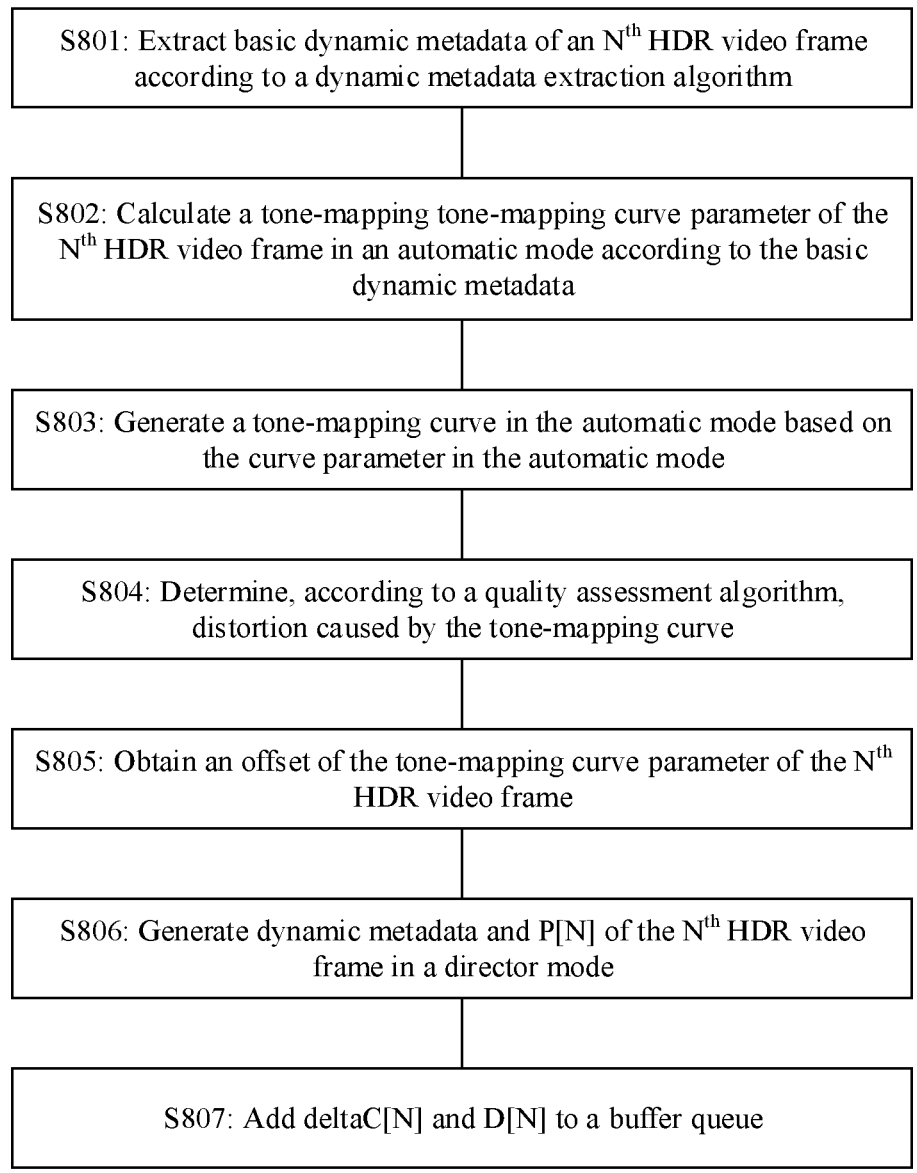
FIG. 12 is a schematic flowchart of a high dynamic range HDR video processing method according to an embodiment of this application.

The following describes the method in this application in detail with reference to the form of the tone-mapping curve shown in the foregoing formula (7). FIG. 12 is a schematic flowchart of a high dynamic range HDR video processing method 800 according to an embodiment of this application. The method 800 may be applied to the scenario shown in FIG. 1 or FIG. 11, or certainly may be applied to another scenario in which video processing needs to be performed. This is not limited in this embodiment of this application.

It should be understood that in this embodiment of this application, the method is described by using an example in which the method is executed by an encoding device. By way of example and not limitation, the method may alternatively be executed by a chip, a chip system, a processor, or the like that is used in the encoding device.

As shown in FIG. 12, the method 800 shown in FIG. 12 may include S801 to S807. The following describes the steps in the method 800 in detail with reference to FIG. 12.

S801: An encoding device extracts basic dynamic metadata of an $N^{th}$ HDR video frame according to a dynamic metadata extraction algorithm.

S802: The encoding device calculates tone-mapping (tone-mapping) curve parameters, for example, curve parameters p and a, of the $N^{th}$ HDR video frame in an automatic mode based on the basic dynamic metadata.

S803: The encoding device generates a tone-mapping curve in the automatic mode based on the curve parameters p and a in the automatic mode.

S804: The encoding device determines, according to a quality assessment algorithm, distortion D' caused by the tone-mapping curve.

S805: The encoding device obtains an offset deltaC[N] of the tone-mapping curve parameter of the $N^{th}$ HDR video frame based on metadata of (N−M, N) frames in an M-frame window, the tone-mapping curve parameter, and D', where N is greater than 0.

S806: The encoding device generates dynamic metadata and P[N] of the $N^{th}$ HDR video frame in a director mode according to the dynamic metadata generation algorithm and the offset deltaC[N] of the curve parameter of the $N^{th}$ HDR video frame, where P[N] is a curve parameter P used when the mode used by the $N^{th}$ HDR video frame is the director mode.

The method further includes: generating an adjusted tone-mapping curve according to the offset deltaC[N] of the curve parameter of the $N^{th}$ HDR video frame; and determining distortion $D_T$ caused by the adjusted tone-mapping curve according to a quality assessment algorithm, where $D_T$ is used to predict an offset deltaC[N+j] of the $(N+j)^{th}$ frame in the director mode, and j is greater than or equal to 1 and less than or equal to M.

In an implementation, determining a plurality of offsets of the adjusted curve parameter p based on a predicted offset of the curve parameter p and K×basic step size includes: determining the plurality of offsets based on the basic delta±M×basic step size, where M is each positive integer less than or equal to K.

In an implementation, the first condition is selecting a D" less than a first threshold from the plurality of D", for example, the first threshold is 0.3. Alternatively, the first condition may be selecting a smallest D" from the plurality of D".

Specifically, after the predicted offset delta is obtained, an exhaustive method may be used to search for a better offset. In the exhaustive search, K is an integer. For example, if K is 3, seven different values delta−3×stepsize, delta−2×stepsize, delta−stepsize, delta, delta+stepsize, delta+2×stepsize, delta+3×stepsize are searched for, and the one with the minimum subjective distortion is selected. The offset is recorded as deltaC, the parameter p=P'+deltaC, a is calculated by using p, a parameter set P={p, a}, and the corresponding subjective distortion is recorded as DT.

S807: Add deltaC[N] and D[N] to a buffer queue to predict a parameter offset of a next frame f(N+1), where D[N]=DT, and the offset deltaC[N]=deltaC. It should be noted that the queue herein refers to a queue used for time-domain filtering above. The first in first out rule is used for the queue. If the queue is full, the head of the queue is removed each time, and then new data is added to the end of the queue.

It should be understood that the method 801 to 804 corresponds to the method 501 to 504. Therefore, for related descriptions of the method 801 to 804, refer to the method 501 to 504. To avoid repetition, details are not described herein again.

In this embodiment of this application, based on the automatic mode, the curve parameter is optimized by using the quality assessment model as a standard, so that better tone-mapping effect can be achieved. When computing resources are sufficient, the optimal parameter is searched for by using the exhaustive method. This improves the effect to a maximum extent. Switching between the automatic mode and the director mode is omitted, reducing system complexity.

It should be understood that, in the method 800, the encoding device may also perform offset correction twice by using delta as a reference, calculate two correction values of delta by adding one step and subtracting one step respectively, and compare the two correction values for smaller distortion. For details, refer to step S406 and step S407.

In the foregoing embodiment of this application, it is described that the encoding device needs to switch between the automatic mode and the director mode for the $N^{th}$ HDR video frame, or use the director mode for the $N^{th}$ HDR video frame. Switching between the automatic mode and the director mode needs to be performed for the $N^{th}$ HDR video frame during encoding, or an action of using the director mode for the $N^{th}$ HDR video frame may also be performed by a decoding device. This application further provides a high dynamic range HDR video processing method, and the method is performed by a decoding device.

Figure 13:
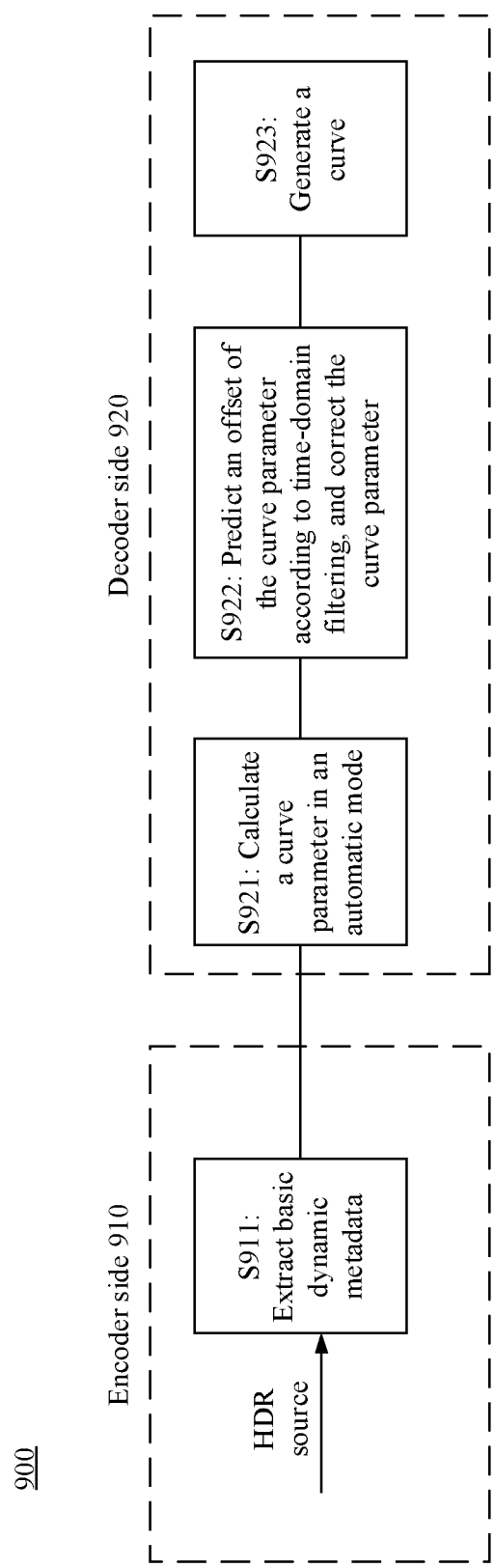
FIG. 13 is a schematic block diagram of a system to which a high dynamic range HDR video processing method is applied according to this application.

FIG. 13 is a schematic block diagram of a system to which a high dynamic range HDR video processing method is applied according to this application. As shown in FIG. 13, the method may be applied to a system including an encoder side 910 and a decoder side 920.

The encoder side 910 may perform step S911: The encoder side 910 extracts basic dynamic metadata of an HDR source video according to a dynamic metadata extraction algorithm; S912: The encoder side 910 transmits the extracted basic dynamic metadata and the compressed video together to the decoder side; S921: The decoder side 920 calculates a curve parameter in an automatic mode; S922: The decoder side 920 predicts and corrects an offset of the curve parameter, updates the curve parameter, and finally generates a curve; and S923: The decoder side 920 generates the curve according to the updated curve parameter. After generating the curve parameter, the decoder side 920 performs display adaptation based on the decoded HDR video, and displays the HDR video.

Figure 14B:
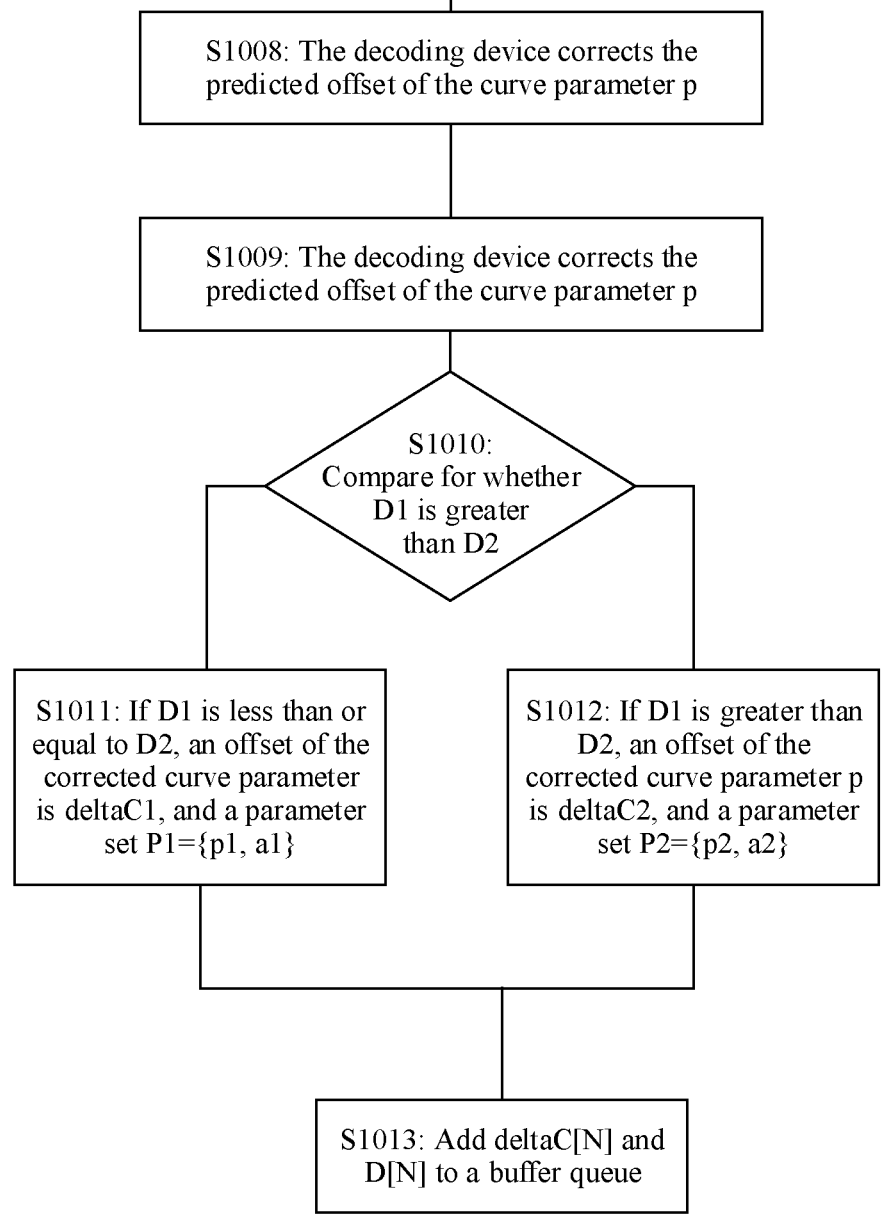

FIG. 14A and FIG. 14B are a schematic flowchart of a high dynamic range HDR video processing method 1000 according to an embodiment of this application. The method 1000 may be applied to the scenario shown in FIG. 1 or FIG. 13, or certainly may be applied to another scenario in which video processing needs to be performed. This is not limited in this embodiment of this application.

It should be understood that in this embodiment of this application, the method is described by using an example in which the method is executed by a decoding device. By way of example and not limitation, the method may alternatively be executed by a chip, a chip system, a processor, or the like that is used in the decoding device.

As shown in FIG. 14A and FIG. 14B, the method 1000 shown in FIG. 14A and FIG. 14B may include S1001 to S1013. The following describes the steps in the method 1000 in detail with reference to FIG. 14A and FIG. 14B.

S1001: A decoding device extracts basic dynamic metadata of an $N^{th}$ HDR video frame according to a dynamic metadata extraction algorithm.

S1002: The decoding device calculates tone-mapping curve parameters p and a of the $N^{th}$ HDR video frame in an automatic mode based on the basic dynamic metadata.

S1003: The decoding device generates a tone-mapping curve in the automatic mode based on the curve parameters p and a in the automatic mode.

S1004: The decoding device determines, according to a quality assessment algorithm, subjective distortion D' caused by the tone-mapping curve in the automatic mode.

In this step, the decoding device generates the tone-mapping curve in the automatic mode based on the curve parameters p and a in the automatic mode, to perform tone-mapping, and inputs two images before and after tone-mapping to a quality assessment model, to calculate the subject distortion D'.

S1005: The decoding device compares D' and $D_T$, to determine whether to use the automatic mode, where $D_T$ is a threshold value.

S1006: When D' is less than or equal to $D_T$, the decoding device adapts the $N^{th}$ HDR video frame in the automatic mode.

S1007: When D' is greater than D', $D_T$ is a preset value, and the decoding device predicts an offset delta of an optimal curve parameter relative to a parameter p in the automatic mode by using a time-domain filtering method.

S1008: The decoding device corrects the predicted offset of the curve parameter p, where the offset of the corrected curve parameter p is the predicted offset of the curve parameter p minus a basic step size, that is, deltaC1=delta−stepsize, and recommended stepsize is 0.1 for the parameter p; determines an adjusted curve parameter p1 based on the curve parameter p in the automatic mode and the offset of the corrected curve parameter p, where p1=p+deltaC1, that is, a1 is calculated according to p1; generates an adjusted tone-mapping curve according to the parameter p1 and a1; and determines, according to the quality assessment algorithm, distortion D1 caused by each tone-mapping curve among the plurality of adjusted tone-mapping curves.

S1009: The decoding device corrects the predicted offset of the curve parameter p, where the offset of the corrected curve parameter p is the predicted offset of the curve parameter p plus the basic step size, that is, deltaC2=delta−stepsize; determines an adjusted curve parameter p2 based on the curve parameter p in the automatic mode and the offset of the corrected curve parameter p, that is, calculates a2 according to p2; generates an adjusted tone-mapping curve according to the parameter p2 and a2; and determines, according to the quality assessment algorithm, distortion D2 caused by each tone-mapping curve among the plurality of adjusted tone-mapping curves.

In this embodiment of this application, the correction value is calculated only twice because the quality assessment model needs to be calculated once each time a correction value is tested and a calculation amount of the quality assessment model is large. Therefore, in this embodiment of this application, it is limited that the correction value is calculated twice. In this way, it cannot be ensured that an optimal value is obtained for each frame. However, a value closer to the optimal value (by a step) may be obtained on the basis of the predicted value, so that the predicted value gradually converges to a value close to the optimal value as time elapses.

S1010: The decoding device compares D1 and D2.

S1011: If D1 is less than or equal to D2, an offset of the corrected curve parameter p is deltaC1, distortion of the corrected curve parameter DT=D1, a parameter set P1={p1, a1}, a curve parameter of the $N^{th}$ HDR video frame P[N]=P1, distortion D[N]=DT=D1, and an offset deltaC[N]=deltaC1, and the decoding device generates a tone-mapping curve based on the curve parameter P1 of the $N^{th}$ HDR video frame.

S1012: If D1 is greater than D2, an offset of the corrected curve parameter p is deltaC2, distortion of the corrected curve parameter DT=D2, a parameter set P2={p2, a2}, a curve parameter of the $N^{th}$ frame P[N]=P2, distortion D[N]=DT=D2, and an offset deltaC[N]=deltaC2, and the decoding device generates a tone-mapping curve based on the curve parameter P2 of the $N^{th}$ HDR video frame.

S1013: Add deltaC[N] and D[N] to a buffer queue to predict a parameter offset of a next frame f(N+1). It should be noted that the queue herein refers to a queue used for time-domain filtering above. The first in first out rule is used for the queue. If the queue is full, the head of the queue is removed each time, and then new data is added to the end of the queue.

In this embodiment of this application, based on the automatic mode, the decoder side optimizes the curve parameter by using the quality assessment model as a standard, so that better tone-mapping effect can be achieved. In this embodiment of this application, the quality assessment model is calculated for three times per frame, with one time for the automatic mode, and two times for the correction process. The calculation amount is controllable. Minimum and maximum luminance of a target display need to be known for curve calculation and optimization of dynamic tone-mapping. Therefore, compared with curve calculation and optimization on the encoder side in the embodiment, the luminance information of the target display is more accurate and the effect is better for curve calculation and optimization on the decoder side.

It should be understood that the decoding device determines the plurality of offsets of the adjusted curve parameter p based on the predicted offset delta of the curve parameter p and K×basic step size. For details, refer to the method 506.

In the foregoing embodiment, the decoding device needs to determine the automatic mode. However, there is a high probability that a predicted and corrected parameter curve is better than that in the automatic mode. Therefore, determining the automatic mode may be omitted, to reduce system complexity. In addition, calculation of subjective distortion in the automatic mode may also be omitted if the automatic mode is omitted. Therefore, the decoding device may directly perform correction in the automatic mode without automatic mode determining, to obtain the offset deltaC[N] of the curve parameter of the $N^{th}$ HDR video frame. The decoding device directly performs correction in the automatic mode to obtain the offset deltaC[N] of the curve parameter of the $N^{th}$ HDR video frame. For a specific process, refer to the process in which the encoding device transmits the HDR video in the director mode in the method 800.

It should be further understood that, for an execution process of the decoding device, reference may be made to the corresponding encoding device. A difference lies in that: first, the parameter P[N] obtained after optimization by the decoding device does not need to be written into the dynamic metadata; and second, the decoding device generates a curve by using the optimized curve parameter P[N].

Figure 15:
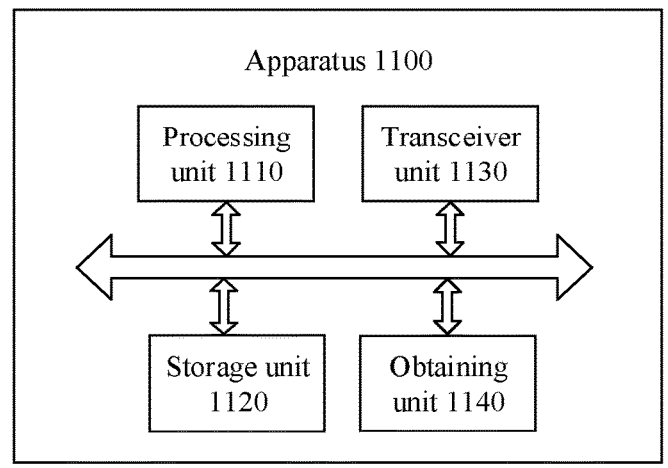
FIG. 15 is a schematic block diagram of an apparatus according to an embodiment of this application.
Figure 16:
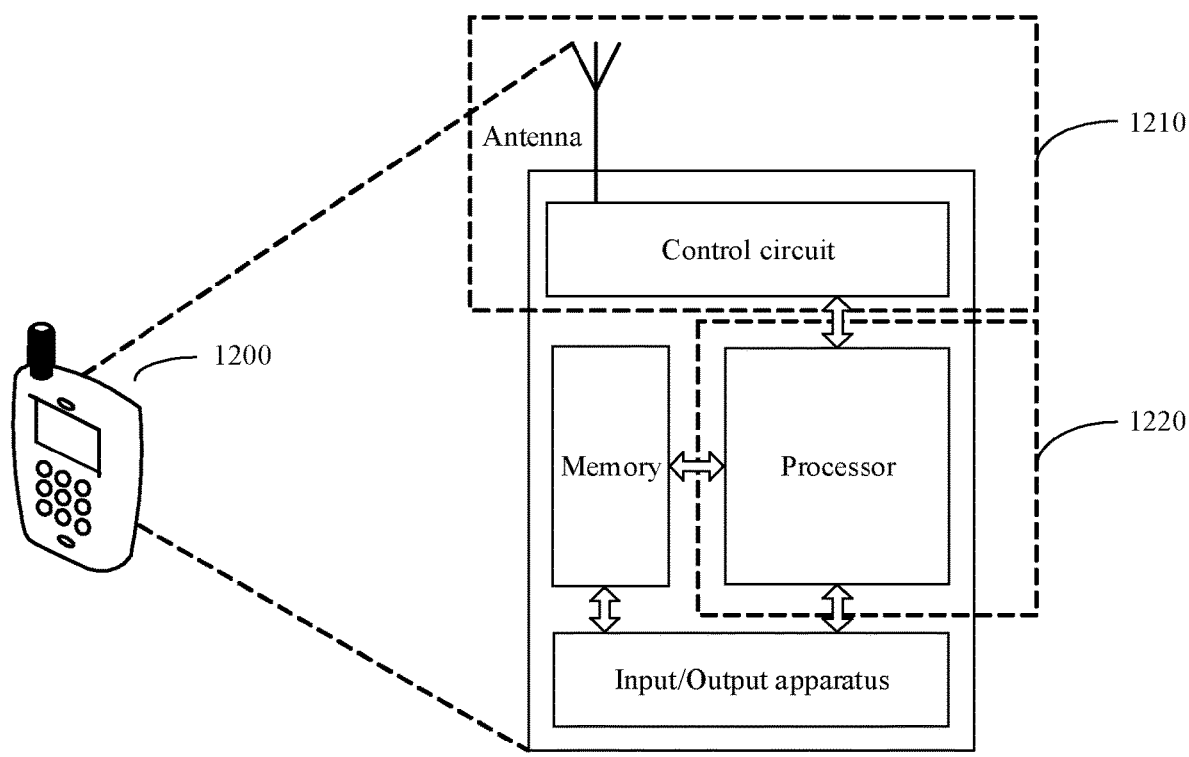
FIG. 16 is a schematic diagram depicting a structure of a terminal device according to this application.

The following describes in detail the communication apparatuses in embodiments of this application with reference to FIG. 15 to FIG. 16.

FIG. 15 is a schematic block diagram of an apparatus 1100 according to an embodiment of this application.

In some embodiments, the apparatus 1100 may be a terminal device, or may be a chip or a circuit, for example, a chip or a circuit that may be deployed in the terminal device.

In a possible manner, the apparatus 1100 may include a processing unit 1110 (that is, an example of a processor) and a transceiver unit 1130. In some possible implementations, the processing unit 1110 may also be referred to as a determining unit. In some possible implementations, the transceiver unit 1130 may include a receiving unit and a sending unit.

In an implementation, the transceiver unit 1130 may be implemented using a transceiver, a transceiver-related circuit, or an interface circuit.

In an implementation, the apparatus may further include a storage unit 1120. In a possible manner, the storage unit 1120 is configured to store instructions. In an implementation, the storage unit may alternatively be configured to store data or information. The storage unit 1120 may be implemented by using a memory.

In some possible designs, the processing unit 1110 is configured to execute the instructions stored in the storage unit 1120, to enable the apparatus 1100 to implement the steps performed by the terminal device in the foregoing method. Alternatively, the processing unit 1110 may be configured to invoke the data in the storage unit 1120, to enable the apparatus 1100 to implement the steps performed by the terminal device in the foregoing method.

In some possible designs, the processing unit 1110 is configured to execute the instructions stored in the storage unit 1120, to enable the apparatus 1100 to implement the steps performed by the access network device in the foregoing method. Alternatively, the processing unit 1110 may be configured to invoke the data in the storage unit 1120, to enable the apparatus 1100 to implement the steps performed by the access network device in the foregoing method.

For example, the processing unit 1110, the storage unit 1120, and the transceiver unit 1130 may communicate with each other through an internal connection path to transfer a control signal and/or a data signal. For example, the storage unit 1120 is configured to store a computer program. The processing unit 1110 may be configured to invoke the computer program from the storage unit 1120 and run the computer program, to control the transceiver unit 1130 to receive a signal and/or send a signal, to complete the steps of the terminal device or the access network device in the foregoing method. The storage unit 1120 may be integrated into the processing unit 1110, or may be disposed separately from the processing unit 1110.

Optionally, if the apparatus 1100 is a communication device (for example, a terminal device), the transceiver unit 1130 includes a receiver and a transmitter. The receiver and the transmitter may be a same physical entity or different physical entities. When the receiver and the transmitter are a same physical entity, the receiver and the transmitter may be collectively referred to as a transceiver.

When the apparatus 1100 is a terminal device, the transceiver unit 1130 may be a sending unit or a transmitter when sending information, and the transceiver unit 1130 may be a receiving unit or a receiver when receiving information. The transceiver unit may be a transceiver. The transceiver, the transmitter, or the receiver may be a radio frequency circuit. When the apparatus includes the storage unit, the storage unit is configured to store computer instructions. The processor is communicatively connected to the memory. The processor executes the computer instructions stored in the memory, so that the apparatus can perform the method 200, the method 1100, or the method 600. The processor may be a general-purpose central processing unit (CPU), a microprocessor, or an application-specific integrated circuit (ASIC).

Optionally, if the apparatus 1100 is a chip or a circuit, the transceiver unit 1130 includes an input interface and an output interface.

When the apparatus 1100 is a chip, the transceiver unit 1130 may be an input and/or output interface, a pin, a circuit, or the like. The processing unit 1110 may execute computer-executable instructions stored in the storage unit, so that the apparatus can perform the method 200, the method 1100, or the method 600. Optionally, the storage unit is a storage unit in the chip, for example, a register or a buffer, or the storage unit may be a storage unit in the terminal but outside the chip, for example, a read-only memory (ROM), another type of static storage device capable of storing static information and instructions, or a random access memory (RAM).

In an implementation, it may be considered that a function of the transceiver unit 1130 is implemented by using a transceiver circuit or a dedicated transceiver chip. It may be considered that the processing unit 1110 is implemented by using a dedicated processing chip, a processing circuit, a processing unit, or a general-purpose chip.

In another implementation, it may be considered that the communication device (for example, the terminal device or the access network device) provided in this embodiment of this application is implemented by using a general-purpose computer. That is, program code for implementing functions of the processing unit 1110 and the transceiver unit 1130 is stored in the storage unit 1120, and a general-purpose processing unit implements the functions of the processing unit 1110 and the transceiver unit 1130 by executing the code in the storage unit 1120.

In some embodiments, the apparatus 1100 may be an encoding device, or a chip or a circuit that is disposed in the encoding device. When the apparatus 1100 is an encoding device, or a chip or a circuit that is disposed in the encoding device, the apparatus includes: an obtaining unit 1140, where the obtaining unit 1140 is configured to obtain dynamic metadata of an $N^{th}$ HDR video frame according to a dynamic metadata generation algorithm, and N is greater than 0; and a processing unit 1110, configured to calculate a tone-mapping curve parameter of the $N^{th}$ HDR video frame based on the dynamic metadata of the $N^{th}$ HDR video frame. The processing unit 1110 is further configured to generate a tone-mapping curve based on the curve parameter; the processing unit 1110 is further configured to determine, according to a quality assessment algorithm, distortion D' caused by the tone-mapping curve; the processing unit 1110 is further configured to compare D' and $D_T$, to determine a mode used by the $N^{th}$ HDR video frame, where the mode is an automatic mode or a director mode, and $D_T$ is a threshold value; and the processing unit 1110 is further configured to determine metadata of the $N^{th}$ HDR video frame based on the determined mode used by the $N^{th}$ HDR video frame.

In an implementation, the processing unit 1110 is specifically configured to: determine that the $N^{th}$ HDR video frame uses the director mode when D' is greater than $D_T$, where $D_T$ is distortion of the $N^{th}$ HDR video frame in the director mode; or determine that the $N^{th}$ HDR video frame uses the automatic mode when D' is less than or equal to $D_T$.

In an implementation, the processing unit 1110 is further configured to obtain an offset deltaC[N] of the curve parameter of the $N^{th}$ HDR video frame based on metadata of (N−M, N) frames in an M-frame window, the tone-mapping curve parameter, and D', where M is greater than 0.

In an implementation, the processing unit 1110 is further configured to: generate an adjusted tone-mapping curve according to the deltaC[N]; and determine, according to the quality assessment algorithm, distortion $D_T$ caused by the adjusted tone-mapping curve.

In an implementation, the processing unit 1110 is specifically configured to: generate the metadata of the $N^{th}$ HDR video frame based on the mode used by the $N^{th}$ HDR video frame, the dynamic metadata generation algorithm, and the offset deltaC[N] of the tone-mapping curve parameter.

In an implementation, the encoding device is applied to any one or more of the following preset configuration parameters: 1000-nit, 500-nit, and a standard dynamic range SDR.

In an implementation, the tone-mapping (tone-mapping) curve is shown by the formula (16):

$$L' = F(L) = a \times \left( \frac{p \times L^n}{(p-1) \times L^n + 1} \right)^m + b \quad (16)$$

Curve parameters a and p are determined based on the dynamic metadata of the $N^{th}$ HDR video frame, curve parameters b, n, and m are preset values, L is input luminance, and L' is output luminance.

In an implementation, the processing unit 1110 is further configured to: determine a plurality of offsets of the adjusted curve parameter p based on a predicted offset of the curve parameter p and K×basic step size, where K is a positive integer greater than or equal to 0; determine, based on the plurality of offsets of the curve parameter p, curve parameters p" and a" corresponding to each of the plurality of offsets of the curve parameter p; generate a plurality of adjusted tone-mapping curves based on the parameters p" and a" corresponding to each of the plurality of offsets; determine, according to the quality assessment algorithm, distortion D" caused by each of the plurality of adjusted tone-mapping curves; and selecting any D" meeting a first condition from the plurality of D", where tone-mapping curve parameters p" and a" corresponding to the any D" are selected as adjustment targets of curve parameters p' and a', and $D_T$ is the selected D".

In an implementation, the processing unit 1110 is specifically configured to: When K is 1, the determined offset is the predicted offset of the curve parameter p plus the basic step size, and the predicted offset of the curve parameter p minus the basic step size.

In an implementation, the first condition is selecting a tone-mapping curve parameter corresponding to smaller distortion D" between two distortion D" values.

In an implementation, the processing unit 1110 is specifically configured to: determine the plurality of offsets based on the basic delta±M×basic step size, where M is each positive integer less than or equal to K.

In an implementation, the first condition is selecting a smallest D" from the plurality of D", or selecting a D" less than a first threshold from the plurality of D".

In an implementation, the processing unit 1110 is further configured to:

determine the predicted offset of the curve parameter p according to the formula (17):

$$\text{delta} = \frac{\sum_{k=1}^{M} \text{deltaC}[N-k]/D[N-k]}{\sum_{k=1}^{M} 1/D[N-k]} \quad (17)$$

deltaC[N−k] represents an offset used by an $(N−k)^{th}$ frame, D[N−k] represents distortion of the $(N−k)^{th}$ frame calculated according to the quality assessment algorithm, and M is a window length.

In an implementation, the processing unit 1110 is specifically configured to: When the mode used by the $N^{th}$ HDR video frame is the automatic mode, the metadata of the $N^{th}$ HDR video frame includes the dynamic metadata of the $N^{th}$ HDR video frame; or when the mode used by the $N^{th}$ HDR video frame is the director mode, the metadata of the $N^{th}$ HDR video frame includes the dynamic metadata of the $N^{th}$ HDR video frame and P[N], where P[N] is a curve parameter P used when the mode used by the $N^{th}$ HDR video frame is the director mode.

In an implementation, the metadata of the $N^{th}$ HDR video frame includes a flag bit, and the flag bit indicates that the mode used by the $N^{th}$ HDR video frame is the director mode, or the flag bit indicates that the mode used by the $N^{th}$ HDR video frame is the automatic mode.

When the apparatus 1100 is configured in an encoding device or is an encoding device, modules or units in the apparatus 1100 may be configured to perform actions or processing processes performed by the encoding device in the foregoing method. To avoid repetition, detailed description thereof is omitted herein.

In some embodiments, the apparatus 1100 may be a decoding device, or a chip or a circuit that is disposed in the decoding device. When the apparatus 1100 is a decoding device, or a chip or a circuit that is disposed in the decoding device, the apparatus includes: an obtaining unit 1140, where the obtaining unit 1140 is configured to obtain an $N^{th}$ HDR video frame and metadata of the $N^{th}$ HDR video frame; and a processing unit 1110, configured to determine, according to a flag bit in the metadata, a mode used by the $N^{th}$ HDR video frame.

In an implementation, when the flag bit indicates that the mode used by the $N^{th}$ HDR video frame is an automatic mode, the processing unit 1110 is further configured to: calculate a tone-mapping curve parameter in the automatic mode based on the metadata of the $N^{th}$ HDR video frame; generate a tone-mapping curve in the automatic mode based on the tone-mapping curve parameter; and display the $N^{th}$ HDR video frame based on the tone-mapping curve in the automatic mode and the $N^{th}$ HDR video frame.

In an implementation, when the flag bit indicates that the mode used by the $N^{th}$ HDR video frame is a director mode, the processing unit 1110 is further configured to: extract a tone-mapping curve parameter in the director mode from the dynamic metadata; generate a tone-mapping curve in the director mode based on the curve parameter; and display the $N^{th}$ HDR video frame based on the tone-mapping curve in the director mode and the $N^{th}$ HDR video frame.

When the apparatus 1100 is configured in a decoding device or is a decoding device, modules or units in the apparatus 1100 may be configured to perform actions or processing processes performed by the decoding device in the foregoing method. To avoid repetition, detailed description thereof is omitted herein.

In some embodiments, the apparatus 1100 may be a decoding device, or a chip or a circuit that is disposed in the decoding device. When the apparatus 1100 is a decoding device, or a chip or a circuit that is disposed in the decoding device, the apparatus includes: an obtaining unit 1140, where the obtaining unit 1140 is configured to obtain dynamic metadata of an $N^{th}$ HDR video frame according to a dynamic metadata generation algorithm; and a processing unit 1110, configured to calculate a tone-mapping curve parameter of the HDR video. The processing unit 1110 is further configured to generate a tone-mapping curve based on the curve parameter; the processing unit 1110 is further configured to determine, according to a quality assessment algorithm, distortion D' caused by the tone-mapping curve; the processing unit 1110 is further configured to obtain an offset deltaC[N] of the curve parameter of the $N^{th}$ HDR video frame based on metadata of (N–M, N) frames in an M-frame window, the tone-mapping curve parameter, and D', where N is greater than 0; and the processing unit 1110 is further configured to generate metadata of the $N^{th}$ HDR video frame in a director mode according to the dynamic metadata generation algorithm and the offset deltaC[N] of the curve parameter of the $N^{th}$ HDR video frame.

In an implementation, the processing unit 1110 is further configured to: generate an adjusted tone-mapping curve according to the offset deltaC[N] of the curve parameter of the $N^{th}$ HDR video frame; and determine distortion $D_T$ caused by the adjusted tone-mapping curve according to a quality assessment algorithm, where $D_T$ is used to predict an offset deltaC[N+j] of the $(N+j)t^h$ frame in the director mode, and j is greater than or equal to 1 and less than or equal to M.

In an implementation, the encoding device is applied to any one or more of the following preset configuration parameters: 1000-nit, 500-nit, and a standard dynamic range SDR.

In an implementation, the tone-mapping curve is shown by the formula (18):

$$L' = F(L) = a \times \left( \frac{p \times L^n}{(p-1) \times L^n + 1} \right)^m + b \tag{18}$$

Curve parameters a and p are determined based on the dynamic metadata of the $N^{th}$ HDR video frame, curve parameters b, n, and m are preset values, L is input luminance, and L' is output luminance.

In an implementation, the processing unit 1110 is further configured to: determine a plurality of offsets of the adjusted curve parameter p based on a predicted offset of the curve parameter p and K×basic step size, where K is a positive integer greater than or equal to 0; determine, based on the plurality of offsets of the curve parameter p, curve parameters p" and a" corresponding to each of the plurality of offsets of the curve parameter p; generate a plurality of adjusted tone-mapping curves based on the parameters p" and a" corresponding to each of the plurality of offsets; determine, according to the quality assessment algorithm, distortion D" caused by each of the plurality of adjusted tone-mapping curves; and selecting any D" meeting a first condition from the plurality of D", where tone-mapping curve parameters p" and a" corresponding to the any D" are selected as adjustment targets of curve parameters p' and a', and $D_T$ is the any D" that is selected.

In an implementation, the processing unit 1110 is specifically configured to: When K is 1, the determined offset is the predicted offset of the curve parameter p plus the basic step size, and the predicted offset of the curve parameter p minus the basic step size.

In an implementation, the first condition is selecting a tone-mapping curve parameter corresponding to smaller distortion D" between two distortion D" values.

In an implementation, the processing unit 1110 is specifically configured to: determine the plurality of offsets based on the basic delta±M×basic step size, where M is each positive integer less than or equal to K.

In an implementation, the first condition is selecting a smallest D" from the plurality of D", or selecting a D" less than a first threshold from the plurality of D".

In an implementation, the processing unit 1110 is further configured to:
determine the predicted offset of the curve parameter p according to the formula (19):

$$\text{delta} = \frac{\sum_{k=1}^{M} deltaC[N-k]/D[N-k]}{\sum_{k=1}^{M} 1/D[N-k]} \tag{19}$$

deltaC[N–k] represents an offset used by an $(N-k)^{th}$ frame, D[N–k] represents distortion of the $(N-k)^{th}$ frame calculated according to the quality assessment algorithm, and M is a window length.

In an implementation, the processing unit 1110 is specifically configured to: When the mode used by the $N^{th}$ HDR video frame is the director mode, the metadata of the $N^{th}$ HDR video frame includes basic dynamic metadata of the $N^{th}$ HDR video frame and P[N], where P[N] is a curve parameter P used when the mode used by the $N^{th}$ HDR video frame is the director mode.

In an implementation, the metadata includes a flag bit, and the flag bit indicates that the mode used by the $N^{th}$ HDR video frame is the director mode.

When the apparatus 1100 is configured in an encoding device or is an encoding device, modules or units in the apparatus 1100 may be configured to perform actions or processing processes performed by the encoding device in the foregoing method. To avoid repetition, detailed description thereof is omitted herein.

In some embodiments, the apparatus 1100 may be a decoding device, or a chip or a circuit that is disposed in the decoding device. When the apparatus 1100 is a decoding device, or a chip or a circuit that is disposed in the decoding device, the apparatus includes: an obtaining unit 1140, where the obtaining unit 1140 is configured to obtain an $N^{th}$ HDR video frame and dynamic metadata of the $N^{th}$ HDR video frame; and a processing unit 1110, configured to calculate a tone-mapping curve parameter of the $N^{th}$ HDR video frame based on the dynamic metadata of the $N^{th}$ HDR video frame. The processing unit 1110 is further configured to generate a tone-mapping curve based on the curve parameter; the processing unit 1110 is further configured to determine, according to a quality assessment algorithm, distortion D' caused by the tone-mapping curve; and the processing unit 1110 is further configured to compare D' and $D_T$, to determine whether to use an automatic mode, where $D_T$ is a threshold value.

In an implementation, the processing unit 1110 is specifically configured to obtain an offset deltaC[N] of the curve parameter of the $N^{th}$ HDR video frame based on metadata of (N–M, N) frames in an M-frame window, the tone-mapping curve parameter, and D' when D' is greater than $D_T$, where M is greater than 0.

In an implementation, the processing unit 1110 is further configured to: generate an adjusted tone-mapping curve according to the deltaC[N]; and determine, according to the quality assessment algorithm, distortion $D_T$ caused by the adjusted tone-mapping curve.

In an implementation, the decoding device is applied to any one or more of the following preset configuration parameters: 1000-nit, 500-nit, and a standard dynamic range SDR.

In an implementation, the tone-mapping curve is shown by the formula (20):

$$L' = F(L) = a \times \left(\frac{p \times L^n}{(p-1) \times L^n + 1}\right)^m + b \quad (20)$$

Curve parameters a and p are determined based on the dynamic metadata of the $N^{th}$ HDR video frame, curve parameters b, n, and m are preset values, L is input luminance, and L' is output luminance.

In an implementation, the processing unit 1110 is further configured to: determine a plurality of offsets of the adjusted curve parameter p based on a predicted offset of the curve parameter p and K×basic step size, where K is a positive integer greater than or equal to 0; determine, based on the plurality of offsets of the curve parameter p, curve parameters p" and a" corresponding to each of the plurality of offsets of the curve parameter p; generate a plurality of adjusted tone-mapping curves based on the parameters p" and a" corresponding to each of the plurality of offsets; determine, according to the quality assessment algorithm, distortion D" caused by each of the plurality of adjusted tone-mapping curves; and selecting any D" meeting a first condition from the plurality of D", where tone-mapping curve parameters p" and a" corresponding to the any D" are selected as adjustment targets of curve parameters p' and a', and $D_T$ is the selected D".

In an implementation, the processing unit 1110 is specifically configured to: When K is 1, the determined offset is the predicted offset of the curve parameter p plus the basic step size, and the predicted offset of the curve parameter p minus the basic step size.

In an implementation, the first condition is selecting a tone-mapping curve parameter corresponding to smaller distortion D" between two distortion D" values.

In an implementation, the processing unit 1110 is specifically configured to: determine the plurality of offsets based on the basic delta±M×basic step size, where M is each positive integer less than or equal to K.

In an implementation, the first condition is selecting a smallest D" from the plurality of D", or selecting a D" less than a first threshold from the plurality of D".

In an implementation, the processing unit 1110 is further configured to:
determine the predicted offset of the curve parameter p according to the formula (21):

$$\text{delta} = \frac{\sum_{k=1}^{M} deltaC[N-k]/D[N-k]}{\sum_{k=1}^{M} 1/D[N-k]} \quad (21)$$

deltaC[N−k] represents an offset used by an $(N-k)^{th}$ frame, D[N−k] represents distortion of the $(N-k)^{th}$ frame calculated according to the quality assessment algorithm, and M is a window length.

When the apparatus 1100 is configured in a decoding device or is a decoding device, modules or units in the apparatus 1100 may be configured to perform actions or processing processes performed by the decoding device in the foregoing method. To avoid repetition, detailed description thereof is omitted herein.

FIG. 16 is a schematic diagram depicting a structure of a terminal device 1200 according to this application. The terminal device 1200 may perform the actions performed by the terminal device in the foregoing method embodiments.

For ease of description, FIG. 16 shows only main components of the terminal device. As shown in FIG. 16, the terminal device 1200 includes a processor, a memory, a control circuit, an antenna, and an input/output apparatus.

The processor is mainly configured to: process a communication protocol and communication data, control the entire terminal device, execute a software program, and process data of the software program. For example, the processor is configured to support the terminal device in performing the actions described in the embodiments of the transmission precoding matrix indication method. The processor may implement functions of the processing unit and the obtaining unit. The memory is mainly configured to store the software program and the data, for example, store a codebook described in the foregoing embodiment. The control circuit is mainly configured to perform conversion between a baseband signal and a radio frequency signal, and process the radio frequency signal. The control circuit and the antenna together may also be referred to as a transceiver, and are mainly configured to receive and send a radio frequency signal in an electromagnetic wave form. The input/output apparatus, such as a touchscreen, a display, or a keyboard, is mainly configured to receive data input by a user and output data to the user.

After the terminal device is powered on, the processor may read the software program in the storage unit, interpret and execute instructions of the software program, and process data of the software program. When data needs to be sent wirelessly, the processor performs baseband processing on the to-be-sent data, and then outputs a baseband signal to a radio frequency circuit. The radio frequency circuit performs radio frequency processing on the baseband signal, and then sends a radio frequency signal in an electromagnetic wave form through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 16 shows only one memory and one processor. An actual terminal device may include a plurality of processors and memories. The memory may also be referred to as a storage medium, a storage device, or the like. This is not limited in embodiments of this application.

For example, the processor may include a baseband processor and a central processing unit. The baseband processor is mainly configured to process the communication protocol and the communication data. The central processing unit is mainly configured to control the entire terminal device, execute the software program, and process the data of the software program. Functions of the baseband processor and the central processing unit are integrated into the processor in FIG. 16. A person skilled in the art may understand that the baseband processor and the central processing unit each may be an independent processor, and are interconnected by using technologies such as a bus. A person skilled in the art may understand that the terminal device may include a plurality of baseband processors to adapt to different network standards, and the terminal device may include a plurality of central processing units to enhance processing capabilities of the terminal device, and components of the terminal device may be connected by using various buses. The baseband processor may alternatively be expressed as a baseband processing circuit or a baseband processing chip. The central processing unit may alternatively be expressed as a central processing circuit or a central processing chip. A function of processing the communication protocol and the communication data may be built in the processor, or may be stored in a storage unit in a form of a software program. The processor executes the software program, to implement a baseband processing function.

For example, in this embodiment of this application, the antenna having a transceiver function and the control circuit may be considered as a transceiver unit 1210 of the terminal device 1200, and the processor having a processing function may be considered as a processing unit 1220 of the terminal device 1200. As shown in FIG. 16, the terminal device 1200 includes the transceiver unit 1210 and the processing unit 1220. The transceiver unit may also be referred to as a transceiver, a transceiver machine, a transceiver apparatus, or the like. Optionally, a component that is in the transceiver unit 1210 and that is configured to implement a receiving function may be considered as a receiving unit, and a component that is in the transceiver unit 1210 and that is configured to implement a sending function may be considered as a sending unit. That is, the transceiver unit includes a receiving unit and a sending unit. For example, the receiving unit may also be referred to as a receiver, a receive machine, or a receiving circuit, and the sending unit may also be referred to as a transmitter, a transmit machine, or a transmitting circuit.

It should be understood that, the processor in embodiments of this application may be a central processing unit (CPU), another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, any conventional processor, or the like.

It may be understood that the memory in embodiments of this application may be a volatile memory or a non-volatile memory, or may include a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) and is used as an external cache. By way of example but not limitative description, random access memories (RAM) in many forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or a part of the foregoing embodiments may be implemented using software, hardware, firmware, or any combination thereof. When software is used to implement the embodiments, the foregoing embodiments may be implemented completely or partially in a form of a computer program product. The computer program product includes one or more computer instructions or computer programs. When the program instructions or the computer programs are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

An embodiment of this application further provides a computer-readable medium that stores a computer program. When the computer program is executed by a computer, the steps performed by the encoding device or the decoding device in any one of the foregoing embodiments are implemented.

An embodiment of this application further provides a computer program product. When the computer program product is executed by a computer, the steps performed by the encoding device or the decoding device in any one of the foregoing embodiments are implemented.

An embodiment of this application further provides a system chip. The system chip includes a communication unit and a processing unit. The processing unit may be, for example, a processor. The communication unit may be, for example, a communication interface, an input/output interface, a pin, a circuit, or the like. The processing unit may execute computer instructions, so that the chip in the communication apparatus performs the steps performed by the encoding device or the decoding device in the foregoing embodiments of this application.

Optionally, the computer instructions are stored in a storage unit.

The embodiments in this application may be used independently, or may be used jointly. This is not limited herein.

In addition, aspects or features of this application may be implemented as a method, an apparatus, or a product that uses standard programming and/or engineering technologies. The term "product" used in this application covers a computer program that can be accessed from any computer-readable component, carrier or medium. For example, a computer-readable medium may include but is not limited to: a magnetic storage component (for example, a hard disk, a floppy disk, or a magnetic tape), an optical disc (for example, a compact disc (CD) and a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a radio channel, and various other media that can store, contain and/or carry an instruction and/or data.

It should be understood that the term "and/or" describes an association relationship between associated objects, and represents that three relationships may exist. For example, A and/or B may represent the following three cases: Only A exists, both A and B exist, and only B exists. The character "/" usually indicates an "or" relationship between the associated objects. The term "at least one" means one or more. The term "at least one of A and B", similar to the term "A and/or B", describes an association relationship between associated objects and represents that three relationships may exist. For example, at least one of A and B may represent the following three cases: Only A exists, both A and B exist, and only B exists.

A person of ordinary skill in the art may be aware that, in combination with units and algorithm steps in the examples described in embodiments disclosed in this specification, this application can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. A part or all of the units may be selected according to actual requirements to achieve the objectives of the solutions of the embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A high dynamic range (HDR) video processing method, wherein the method is applied by an encoding device and comprises:
   obtaining dynamic metadata of an $N^{th}$ HDR video frame according to a dynamic metadata generation algorithm, wherein N is greater than 0;
   calculating a tone-mapping curve parameter of the $N^{th}$ HDR video frame based on the dynamic metadata of the $N^{th}$ HDR video frame;
   generating a tone-mapping curve based on the curve parameter, wherein the tone-mapping curve is the formula (1):

$$L' = F(L) = a \times \left( \frac{p \times L^n}{(p-1) \times L^n + 1} \right)^m + b, \quad (1)$$

wherein
   curve parameters a and p are based on the dynamic metadata of the $N^{th}$ HDR video frame, curve parameters b, n, and m are preset values, L is input luminance, and L' is output luminance;
   determining, according to a quality assessment algorithm, distortion D' caused by the tone-mapping curve;
   comparing D' and $D_T$, wherein $D_T$ is a threshold value; and
   generating metadata of the $N^{th}$ HDR video frame based on the comparing, wherein:
      when D' is not greater than $D_T$ the metadata comprises first curve parameters configured to enable a decoder to generate a tone-mapping curve, and the metadata of the $N^{th}$ HDR video frame comprises the dynamic metadata of the $N^{th}$ HDR video frame, and
      when D' is greater than $D_T$ the metadata is configured to enable the decoder to calculate second curve parameters to similarly enable the decoder to generate a tone-mapping curve, and the metadata of the $N^{th}$ HDR video frame comprises the dynamic metadata of the $N^{th}$ HDR video frame and P[N], wherein P[N] is a curve parameter P used when D' is greater than $D_T$.

2. The method according to claim 1, wherein the comparing D' and $D_T$ comprises:
   determining that the $N^{th}$ HDR video frame will use a director mode when D' is greater than $D_T$, wherein $D_T$ is a distortion of the $N^{th}$ HDR video frame in the director mode; or determining that the $N^{th}$ HDR video frame will use an automatic mode when D' is less than or equal to $D_T$.

3. The method according to claim 2, wherein the method further comprises:
obtaining an offset deltaC [N] of the tone-mapping curve parameter of the $N^{th}$ HDR video frame based on metadata of frames in an M-frame window, the tone-mapping curve parameter, and D', wherein M is greater than 0 and a lower boundary of the M-frame window is an N-$M^{th}$ frame, and an upper boundary of the M-frame window is the $N^{th}$ frame.

4. The method according to claim 3, wherein the generating metadata of the $N^{th}$ HDR video frame comprises:
generating the metadata of the $N^{th}$ HDR video frame based on the mode to be used for the $N^{th}$ HDR video frame, the dynamic metadata generation algorithm, and the offset deltaC [N] of the tone-mapping curve parameter.

5. The method according to claim 1, wherein after the obtaining the dynamic metadata of the $N^{th}$ HDR video frame, the method further comprises:
performing display adaptation based on one or more preset configuration parameters; wherein the preset configuration parameters comprise one or more of the following:
1000-nit, 500-nit, and a standard dynamic range (SDR).

6. The method according to claim 1, wherein the metadata of the $N^{th}$ HDR video frame comprises a flag bit, and the flag bit indicates that the mode to be used for the $N^{th}$ HDR video frame is the director mode, or the flag bit indicates that the mode to be used for the $N^{th}$ HDR video frame is the automatic mode.

7. An encoding device, comprising:
at least one processor; and
at least one memory coupled to the at least one processor and storing instructions for execution by the at least one processor to cause the at least one processor to:
obtain dynamic metadata of an $N^{th}$ HDR video frame according to a dynamic metadata generation algorithm, and N is greater than 0; and
calculate a tone-mapping curve parameter of the $N^{th}$ HDR video frame based on the dynamic metadata of the $N^{th}$ HDR video frame;
generate a tone-mapping curve based on the curve parameter, wherein the tone-mapping curve is the formula (1):

$$L' = F(L) = a \times \left(\frac{p \times L^n}{(p-1) \times L^n + 1}\right)^m + b, \quad (1)$$

wherein
curve parameters a and p are based on the dynamic metadata of the $N^{th}$ HDR video frame, curve parameters b, n, and m are preset values, L is input luminance, and L' is output luminance;
determine, according to a quality assessment algorithm, distortion D' caused by the tone-mapping curve;
compare D' and $D_T$, wherein Dr is a threshold value; and
generate metadata of the $N^{th}$ HDR video frame based on the comparing, wherein:
when D' is not greater than $D_T$ the metadata comprises first curve parameters configured to enable a decoder to generate a tone-mapping curve, and the metadata of the $N^{th}$ HDR video frame comprises the dynamic metadata of the $N^{th}$ HDR video frame, and
when D' is greater than $D_T$ the metadata is configured to enable the decoder to calculate second curve parameters to similarly enable the decoder to generate a tone-mapping curve, and the metadata of the $N^{th}$ HDR video frame comprises the dynamic metadata of the $N^{th}$ HDR video frame and P[N], wherein P[N] is a curve parameter P used when D' is greater than $D_T$.

8. The encoding device according to claim 7, wherein execution by the at least one processor further causes the at least one processor to:
determine that the $N^{th}$ HDR video frame will use a director mode when D' is greater than $D_T$, wherein $D_T$ is a distortion of the $N^{th}$ HDR video frame in the director mode; or
determine that the $N^{th}$ HDR video frame will use an automatic mode when D' is less than or equal to $D_T$.

9. The encoding device according to claim 8, wherein execution by the at least one processor further causes the at least one processor to:
obtain an offset deltaC [N] of the tone-mapping curve parameter of the $N^{th}$ HDR video frame based on metadata of frames in an M-frame window, the tone-mapping curve parameter, and D', wherein M is greater than 0 and a lower boundary of the M-frame window is an N-$M^{th}$ frame, and a upper boundary of the M-frame window is the $N^{th}$ frame.

10. The encoding device according to claim 8, wherein execution by the at least one processor further causes the at least one processor to:
generate the metadata of the $N^{th}$ HDR video frame based on the mode to be used for the $N^{th}$ HDR video frame, the dynamic metadata generation algorithm, and the offset deltaC [N] of the tone-mapping curve parameter.

11. The encoding device according to claim 7, wherein after the obtaining the dynamic metadata of the $N^{th}$ HDR video frame, the encoding device is further configured to perform display adaptation base on any one or more of the following preset configuration parameters:
1000-nit, 500-nit, and a standard dynamic range (SDR).

12. The encoding device according to claim 7, wherein the metadata of the $N^{th}$ HDR video frame comprises a flag bit, and the flag bit indicates that the mode to be used for the $N^{th}$ HDR video frame is the director mode, or the flag bit indicates that the mode to be used for the $N^{th}$ HDR video frame is the automatic mode.

13. A non-transitory computer-readable storage medium, wherein the computer-readable storage medium stores a computer program, and when the computer program is executed by a processor, cause an encoding device to:
obtain dynamic metadata of an $N^{th}$ HDR video frame according to a dynamic metadata generation algorithm, and N is greater than 0; and
calculate a tone-mapping curve parameter of the $N^{th}$ HDR video frame based on the dynamic metadata of the $N^{th}$ HDR video frame;
generate a tone-mapping curve based on the curve parameter, wherein the tone-mapping curve is the formula (1):

$$L' = F(L) = a \times \left(\frac{p \times L^n}{(p-1) \times L^n + 1}\right)^m + b, \quad (1)$$

wherein curve parameters a and p are based on the dynamic metadata of the $N^{th}$ HDR video frame, curve parameters b, n, and m are preset values, L is input luminance, and L' is output luminance;

determine, according to a quality assessment algorithm, distortion D' caused by the tone-mapping curve;

compare D' and $D_T$, wherein Dr is a threshold value; and generate metadata of the $N^{th}$ HDR video frame based on the comparing, wherein:

when D' is not greater than $D_T$ the metadata comprises first curve parameters configured to enable a decoder to generate a tone-mapping curve, and the metadata of the $N^{th}$ HDR video frame comprises the dynamic metadata of the $N^{th}$ HDR video frame, and when D' is greater than $D_T$ the metadata is configured to enable the decoder to calculate second curve parameters to similarly enable the decoder to generate a tone-mapping curve, and the metadata of the $N^{th}$ HDR video frame comprises the dynamic metadata of the $N^{th}$ HDR video frame and P[N], wherein PIN is a curve parameter P used when D' is greater than $D_T$.

14. The non-transitory computer readable medium according to claim 13, wherein when the computer program is executed the processor is further configured to:

determine that the $N^{th}$ HDR video frame will use a director mode when D' is greater than $D_T$, wherein $D_T$ is a distortion of the $N^{th}$ HDR video frame in the director mode; or determine that the $N^{th}$ HDR video frame will use an automatic mode when D' is less than or equal to $D_T$.

15. The non-transitory computer readable medium according to claim 13, wherein when the computer program is executed the processor is further configured to:

obtain an offset deltaC [N] of the tone-mapping curve parameter of the $N^{th}$ HDR video frame based on metadata of frames in an M-frame window, the tone-mapping curve parameter, and D', wherein M is greater than 0 and a lower boundary of the M-frame window is an N-$M^{th}$ frame, and a upper boundary of the M-frame window is the $N^{th}$ frame.

16. The non-transitory computer readable medium according to claim 13, wherein when the computer program is executed the processor is further configured to:

generate the metadata of the $N^{th}$ HDR video frame based on the mode to be used for the $N^{th}$ HDR video frame, the dynamic metadata generation algorithm, and the offset deltaC [N] of the tone-mapping curve parameter.

* * * * *